US005715516A

United States Patent [19]
Howard et al.

[11] Patent Number: 5,715,516
[45] Date of Patent: Feb. 3, 1998

[54] METHOD AND APPARATUS FOR WIRELESS COMMUNICATION EMPLOYING COLLECTOR ARRAYS

[75] Inventors: David Amundson Howard, Mountain View; Bruce Denis Smith, Atherton; Karen Evelyn Coates, San Jose; John Andrew Vastano, Palo Alto, all of Calif.

[73] Assignee: Cellular Telecom, Ltd., Palo Alto, Calif.

[21] Appl. No.: 544,913

[22] Filed: Oct. 18, 1995

[51] Int. Cl.$^6$ .............................. H04Q 7/00; H04Q 9/00
[52] U.S. Cl. ..................... 455/33.1; 455/33.4; 455/34.1; 455/56.1
[58] Field of Search ........................... 455/33.1, 33.2, 455/33.4, 34.1, 54.1, 56.1; 379/59–60; 370/338, 401, 320, 321, 335, 337, 342, 347

[56] References Cited

U.S. PATENT DOCUMENTS

| | | |
|---|---|---|
| 4,797,947 | 1/1989 | Labedz . |
| 5,168,502 | 12/1992 | Millet . |
| 5,233,643 | 8/1993 | Nacini et al. . |
| 5,437,054 | 7/1995 | Rappaport et al. .............. 455/34.1 |
| 5,513,379 | 4/1996 | Benveniste et al. .............. 455/33.2 |
| 5,537,683 | 7/1996 | Hill et al. . |
| 5,539,749 | 7/1996 | Eul . |
| 5,548,806 | 8/1996 | Yamaguchi et al. . |
| 5,625,877 | 4/1997 | Dunn et al. .............. 455/34.1 |

OTHER PUBLICATIONS

Donald C. Cox, *Wireless Personal Communications: What Is It?*, IEEE Communications (Apr. 1995).

DSP Applications, Dec., 1993, pp. 15–28, *Considerations in the Development of a Low Cost High Performance Receiver Based on DSP Techniques*.

"Wireless Digital Communications, Modulation and Spread Spectrum Applications," Kamilo Feher, Prentice Hall PTR, pp. 43–44, New Jersey, 1995.

"Probability of Bit Error for MPSK Modulation with Diversity Reception in Rayleigh Fading and Log–Normal Shadowing Channel", W.–P. Yung, IEEE Trans. on Comm., vol. 38, No. 7, 1990, pp. 933–937.

"Channel Borrowing Without Locking for Sectorized Cellular Communications", by H. Jiang and S.S. Rappaport, IEEE Trans., VT–43, No. 4, 1994, pp. 1067–1077.

*Primary Examiner*—Chi H. Pham
*Assistant Examiner*—Gertrude Arthur
*Attorney, Agent, or Firm*—David E. Lovejoy

[57] ABSTRACT

A cellular communications system that includes forward channel communications to users and corresponding reverse channel communications from mobile users. The users travel from one area to another area over one or more zones. The forward channel communications are broadcast directly to users in a broadcaster zone. The reverse channel communications from users are not returned directly but are first collected at locations arrayed over the broadcaster zone. After collection, the reverse channel communications are forwarded to complete the full duplex communications. The forward channel communications are point to multipoint while the the reverse channel communications are multipoint to point. The communication system separately handles the point to multipoint forward path as a direct broadcast and the multipoint to point reverse path using multiple collection points. Since the forward and reverse paths are separately configured, the present invention optimizes both the forward and reverse paths.

111 Claims, 17 Drawing Sheets

METHOD AND APPARATUS FOR WIRELESS COMMUNICATION EMPLOYING COLLECTOR ARRAYS

BACKGROUND OF THE INVENTION

The present invention relates to the field of two-way wireless communication systems and more specifically to methods and apparatus for communication with mobile telephone users (cellular and personal communication systems), basic exchange telecommunications radio, wireless data communications, and other wireless users.

Historical Mobile Systems

Wireless communication systems, before the present-day cellular systems, included manual/trunked radio systems. The manual/trunked systems were followed by the "improved mobile telephone service" (IMTS). IMTS is a full duplex system using two frequency bands, 150 MHz (known as MJ) and 450 MHz (known as MK). The separation between duplex frequencies is about 5 MHz and channel bandwidth is 25 KHz. An IMTS base site is usually located on elevated terrain using high transmission power to achieve a range of up to 25 miles. The mobile users employ relatively high output power (between 13 W and 30 W) so that one base station site, for example, can serve an entire city. In some IMTS systems, remote receiving systems are used to increase the range and quality of signals from mobile users to base stations. Although IMTS is still used in the United States, the small number of channels available limits its capacity to only a few users in any city.

Conventional Cellular Systems

Due to a large demand for mobile services that could not be satisfied by IMTS or other systems a "new" mobile telephone system was needed. The "new" system that evolved "reused" frequency within a system of cells. Based upon a frequency reuse cellular system, wireless two-way radio frequency (RF) communication has become commonplace, with large numbers of users. In cellular systems, many "cells" are employed where each cell covers a geographic area and has a dedicated fraction of the total amount of RF spectrum which is used to support subscribers (cellular users) located in the cell. Cells are of different sizes (for example, macro-cell or micro-cell) and are generally fixed in capacity. The actual shapes and sizes of cells are complex functions of the terrain, the man-made environment, and the user capacity required. Cells are connected to each other via landlines or microwave links and to the public-switched telephone network (PSTN) through telephone switches that are adapted for mobile communication. The switches provide for the hand-off of users from cell to cell and thus frequency to frequency as mobile users move between cells.

In conventional cellular systems, each cell has a base station with radio frequency (RF) transmitters and RF receivers co-sited for transmitting and receiving communication with cellular users in the cell. The base station employs forward RF frequency bands (carriers) to transmit forward channel communications to users and employs reverse RF carriers to receive reverse channel communications from users in the cell. The forward channel communications are static in that they employ fixed power, at fixed frequencies and with fixed sectors, if sectorized antennas are used.

The base station in addition to providing RF connectivity to users also provides connectivity to a Mobile Telephone Switching Office (MTSO). In a typical cellular system, a number of MTSO's will be used over the coverage region. Each MTSO can service a number of base stations and associated cells in the cellular system and supports switching operations for routing calls between other systems (such as the PSTN) and the cellular system or for routing calls within the cellular system.

Base stations are typically controlled from the MTSO by means of a Base Station Controller (BSC). The BSC assigns RF carriers to support calls, coordinates the handoff of mobile users between base stations, and monitors and reports on the status of base stations. The number of base stations controlled by a single MTSO depends upon the traffic at each base station, the cost of interconnection between the MTSO and the base stations, the topology of the service area and other similar factors.

A handoff between base stations occurs, for example, when a mobile user travels from a first cell to an adjacent second cell. Handoffs also occur to relieve the lead on a base station that has exhausted its traffic-carrying capacity or where poor quality communication is occurring. The handoff is a communication transfer for a particular user from the base station for the first cell to the base station for the second cell. During the handoff, there is a transfer period of time during which the forward and reverse communications to the mobile user are severed with the base station for the first cell and have not been established with the second cell. A typical design criteria is that the transfer period be less than 100 milliseconds.

Advanced Mobile Phone System (AMPS)

The Advanced Mobile Phone System (AMPS) currently is in use in the United States and was defined within the IS54 standard and is currently defined within the IS136 standard. The AMPS system employs Frequency Division Multiple Access (FDMA) RF communication between a base station for a cell and mobile cellular telephones (users) in the cell. The transmit forward channels from the base station to users use 30 KHz carriers in the 25 MHz band between 869.010 and 893.970 MHz and the reverse channels between users and the base station use 30 KHz carriers in the 25 MHz band between 824.010 and 848.970 MHz. There are a total of 832 transmit and receive channel pairs. Each of two providers for a service area has 416 channels, one-half of the 832 total channels in a service area. Of the 416 channels, 21 are reserved as control channels for control functions and the balance of 395 channels are reserved as user channels for user traffic.

Other Conventional Cellular Implementations

The AMPS implementation of the conventional cellular architecture employs the technique of FDMA to partition and reuse the available RF spectral bandwidth so as to increase the number of users that may be served. In the AMPS implementation, a carrier comprising a fraction of the total available bandwidth is employed to carry each logical communications channel. There are several other implementations of the conventional cellular architecture that employ other techniques. In time division multiple access implementations (TDMA), each carrier (possibly the entire available bandwidth or possibly some fraction of the whole bandwidth using a frequency division technique) is divided into time slots such that each logical channel is carried in some subset of the available time slots. In code division multiple access (CDMA) implementations, one carrier (again all or some part of the available bandwidth) is enabled to carry a number of logical channels by the use of non-interfering coding for each channel. In space division multiple access (SDMA) implementations, one carrier is reused several times in a coverage area by use of adaptive or spot beam-forming antennas for either terrestrial or space-based transmitters.

In this specification when referring to conventional cellular systems and the present invention, the terms "carrier" and "channel" will be used interchangeably in describing communications except where the distinction between the physical medium (the bandwidth comprising the carrier) and the logical transport function (the communications channel) must be made clear. Although the AMPS implementation of conventional cellular systems will typically be used to introduce and illustrate the advantages of a new cellular architecture provided by the present invention, any of the other implementations previously available for conventional cellular architectures are also available to the new architecture of the present invention.

System Capacity

A number of parameters determine the capacity of each cell in a cellular system and therefore the overall capacity of the cellular system. One such parameter that constrains the operation is the need for a 630 KHz separation between channels when typical cavity resonators are employed in order to have adequate frequency separation for high-power applications. The constraint is the need for 18 db interference isolation between a channel of interest and power in either the adjacent channels (different center frequencies) broadcast at the same location or in the co-channels (same center frequencies) broadcast at spatially remote locations. The carrier frequency for the communication channel of interest must be separated from the background noise created by intentional and unintentional radiators in the same location. Although the adjacent channels have different center frequencies, none-the-less they still cause interference with the channel of interest since the circuit components do not have perfect isolation. Similarly, the co-channels are located spatially far away from the channel of interest, none-the-less they still interfere with the channel of interest since there is a tendency to place the co-channels nearer than they would be placed to provide perfect isolation in order to increase frequency reuse and thereby increase system capacity. As a practical matter considering all parameters, cells presently are designed to support a maximum of 50 to 56 channels.

In the United States, the Federal Communications Commission (FCC) has set the total number of available frequency channels to be a fixed small number. Therefore, in order to service large numbers of mobile users, channels with the same frequency band must be reused over and over again at locations that are far enough apart so as to not interfere with each other. The cellular areas which reuse the same frequency bands form a pattern, called a reuse pattern, that determines how many subscribers can be accommodated in a particular service area. For example, for a nine-cell reuse pattern that is common for AMPS, the 395 potentially available channels are divided into nine separate and roughly equal groups, resulting in a maximum capacity of 44 (395/9) channels per cell. These channels will provide capacity to serve many more than the corresponding number of users since not all users are likely to be active at the same time. Typically, systems are designed such that no more than 2% of call attempts are blocked at peak system utilization. Although calling statistics vary from service area to service area, an allocation of 44 channels per cell will generally support from 2000 to 3000 users per cell. Reuse patters in user low-density areas often employ as much as a 21-cell reuse pattern. With such a pattern, fewer channels are allocated per cell with better isolation for co-channel interference.

In a user-dense area, cell size is reduced and the number of cells is increased to gain greater user capacity. The frequency reuse pattern may be made smaller by reducing co-channel interference. This reduction may be achieved with directional base station antennas dividing cells into sectors, with different frequency allocations for each of the sectors. A seven-cell reuse pattern with three 120° sectored antennas (denoted (7,3) with about 19 channels per sector) is frequently used in AMPS systems, but optimum frequency allocation is dependent upon the topography of the service area and the architecture of the wireless system.

Cellular Transmission Characteristics

In conventional cellular systems, the forward channel and reverse channel paths are symmetrical. The forward channel communication path is from the base station transmitter to mobile users and the reverse channel communication path is from the mobile users to the base station receiver.

For forward channel communication, the base station transmits from a single location, centrally located in the cell, to the cellular telephone users in the cell. The base station transmission to users is a one-to-many operation. For reverse channel operation of a conventional cellular system, the receivers at the base station at a single location in the cell receive communications over many channels from many mobile user transmitters at different locations in the cell. The base station reception from users is a many-to-one operation.

Although the forward channel and reverse channel paths in a conventional cellular system are symmetrical, the base station transmitters and receivers differ significantly from the user transmitters and receivers. Also, the one-to-many forward channel operation is significantly different from the many-to-one reverse channel operation. In the cellular system, the base station transmitter equipment typically is high powered, is located in an ideal spot within the cell and uses directional high-gain antennas for communications with users. The areas of coverage of base station transmitters are measured and optimized to define the area of the cell considering also the locations of and numbers of users. A base station cellular transmitter is analogous to the transmitter used in one-way commercial broadcast radio systems such as FM radio or television. Each mobile user in the cell communicates on one channel (channel pair) at a time. For forward channel operation (base station to mobile user), each mobile user's receiver receives a signal with a signal strength that varies as a function of the mobile user's location in the cell and proximity to the base station transmitter. In order to compensate for different signal strengths, each user's receiver typically includes simple automatic-gain-control (AGC) circuitry to adjust receiver sensitivity to compensate for the different strengths of the received base station signals. Such user receivers require only enough dynamic range to demodulate one signal at a time.

For reverse channel operation (user to base station) of the conventional cellular system, the receiver at the base station is at a single location in the cell and receives communications over many channels from many mobile user transmitters that are at different locations in the cell. The user locations change as mobile users move about in the cell and therefore, the signal strength varies widely for the signals received by the base station receiver from the mobile users. This wide variance in signal strength requires that base station receivers have a large dynamic range to accommodate weak and strong user signals for many channels.

In order to achieve the necessary dynamic range, conventional systems have required careful design and selection of cell sizes and have required expensive equipment. Further, the use of simple, low-cost AGC circuitry to reduce sensitivity in the base station receiver is often not practical since when such circuitry reduces the signal reception to a level acceptable for strong signals, the weak signals are not received at all. This problem is known as the "near-far" problem, so called because the base station receiver dynamic range will determine how near a mobile user can be to a base station while still enabling reception from the 'far' away mobile user.

The near-far problem is theoretically controllable by using power control schemes on the mobile user transmitters where close user transmitters use low power while far transmitters use high power. In conventional cellular systems, however, such user power control schemes have not been entirely satisfactory since they cause a reduction in battery life for users, cause a decrease in frequency reuse, are not available at cell registration (where full power is required), and have other problems. When the power is increased for a user, the user will tend to interfere more both with adjacent channel and co-channel users. The greater the number of users with increased power levels, the greater the interference. Such increased interference either results in a loss of capacity or a loss of quality.

Because cellular phones generally are battery-operated and limited in power, are close to the ground, often have multi-path, obstruction and other transmission problems, are frequently omni-directional and mobile, the reverse channel path between users and the base station has been the weakest link in conventional cellular communications systems. In addition, users near the edge of a cell typically have to transmit at full power. This precludes channel reuse in adjacent cells.

The Need For New Wireless Systems

Present-day cellular systems have quality problems (due to handoff errors and other failures), have insufficient user capacity (due to limitations of spectrum reuse), and have a high cost. Because of these problems, many new proposals for improving cellular systems have been made.

Many of the proposals for new cellular systems use digital techniques to enhance the air-interface. Digital air protocols, including TDMA and CDMA implementations use modulation, speech and channel coding, multiple access, and other strategies such as time division duplex (TDD) techniques. While these new approaches address capacity and hand-off quality issues, they increase system complexity, the cost of mobile phones, and have reverse path synchronization difficulties that limit coverage. In addition, the standard speech coding algorithms have degraded speech quality in order to get increased capacity.

Personal Communication Systems (PCS)

Personal Communication Systems (PCS) have been proposed for future wireless systems. PCS systems are divided into low-tier PCS and high-tier PCS as a function of radiated power and area covered. The proposed high-tier PCS systems are highly optimized for low bit-rate voice and therefore have limited capability for serving packet-data applications. If the proposed high-tier PCS systems function in the place of today's cellular radio, more than 100 million users in the United States and many more users throughout the world must be served. If the technical issues pertaining to the support of packet-data applications can be solved, the demands for service will be even greater.

The frequencies available in the FCC-licensed Broadband PCS service are grouped into Major Trading Area (MTA) service and Basic Trading Area (BTA) service.

(a) The following frequency blocks are available for assignment on an MTA basis:
Block A: 1850–1865 MHz paired with 1930–1945 MHz; and
Block B: 1870–1885 MHz paired with 1950–1965 MHz.

(b) The following frequency blocks are available for assignment on a BTA basis:
Block C: 1895–1910 MHz paired with 1975–1990 MHz; and
Block D: 1865–1870 MHz paired with 1945–1950 MHz.
Block E: 1885–1890 MHz paired with 1965–1970 MHz; and
Block F: 1890–1895 MHz paired with 1970–1975 MHz.

A separate 20 MHz band, 1910–1930 MHz, was also allocated for low power, unlicensed PCS.

Low-tier PCS systems also have been proposed to serve the world-wide market. Some of the desirable features of low-tier PCS systems are identified by Donald C. Cox, *Wireless Personal Communications: What Is It?*, IEEE Personal Communications (April 1995). These desirable features for a low-tier PCS system include:

Adaptive Differential Pulse Cede Modulation (ADPCM) speech encoding with low power consumption, high quality speech and low delay.

Flexible radio link architecture that will support multiple data rates for data transmission and messaging.

Low transmitter power with adaptive power control to maximize talk time and data transmission time.

Low complexity signal processing to minimize power consumption.

Low co-channel interference and high coverage area.

Multi-level phase modulation with coherent detection to maximize radio link performance and capacity with low complexity.

Frequency division duplexing to relax the requirement for synchronizing base station transmissions over a large region.

A low-tier PCS system contemplates a dense collection of many, low-complexity, low-cost, base stations interconnected with inexpensive fixed-network facilities (copper or fiber based). A high-tier PCS system contemplates sparsely distributed cell sites. The need for high transmission quality that competes with the quality of wireline telephones is not easily achieved using only high-tier PCS systems which tend to maximize users-per-cell-site and users-per-MHz to minimize the number of expensive high-tier cell sites. The frequency-reuse capability of cellular systems leads to high overall system capacity by increasing the number of cells and thereby reducing the separation between base stations. Note, however, that reuse is determined by the reverse path constraints. This frequency reuse need for large capacity suggests that low-tier, small-cell PCS systems will have a dominant position in future wireless systems. However, many complex interrelationships among circuit quality, spectrum utilization, complexity (circuit and network), system capacity, and economies are involved in the design of future wireless systems.

If new wireless systems develop as proposed, the future roles for existing types of wireless systems (such as paging, messaging, cordless telephones and wide area packet-data networks) are uncertain. For example, the PCS systems require an intelligent network in order to manage mobility of users. Cordless telephones, by way of contrast, need independence of network intelligence and need base units that mimic wireline telephones. As another example, data systems often do not tolerate the priority needs of wireless voice communications. Also wireless voice systems often do not recognize the importance of data and messaging. If data systems and voice systems are independently operated, the separate voice and data systems do not take advantage of the economics of sharing network infrastructure and base station equipment.

Although a wide range of technology is available for new and improved wireless systems, the proposals for such systems still have not adequately recognized how to economically satisfy the needs for capacity, coverage, control and quality of new wireless systems.

In accordance with the above background, them is a need for improved wireless communication systems.

SUMMARY OF THE INVENTION

The present invention is a wireless communications system that includes forward channel communications to users and corresponding reverse channel communications from users. Typically, the users are mobile users that travel from one area to another area over one or more zones. The forward channel communications are broadcast directly to users in a broadcaster zone. The reverse channel communications from users are not returned directly but are first collected at locations arrayed over the broadcaster zone. After collection, the reverse channel communications are forwarded to complete the full duplex communications. The forward channel communications are point to multipoint while the reverse channel communications are multipoint to point. The communication system separately handles the point to multipoint forward path as a direct broadcast and the multipoint to point reverse path using multiple collection points. Since the forward and reverse paths are separately configured, the present invention optimizes both the forward and reverse paths to provide a wireless operating system architecture that has greater communications capacity and better communications quality than prior wireless systems.

The forward channel communications and the corresponding reverse channel communications to and from users are under control of a zone manager. The zone manager includes a broadcaster having a broadcaster transmitter for broadcasting forward channel communications using broadband broadcaster signals to form broadcaster forward channels in a broadcaster zone. The zone manager also includes an aggregator for receiving corresponding reverse channel communications. Users in the broadcaster zone include receivers for receiving a forward channel from the broadcaster and include a transmitter for broadcasting reverse channel communications in a user reverse channel. Collectively, the reverse channels from the users provide a broadband composite signal. A plurality of collectors are distributed over the broadcaster zone at spaced-apart locations. Each of the collectors includes a broadband collector receiver for receiving the broadband composite signal from the users and each of the collectors includes collector forwarding means for forwarding to the aggregator the reverse channel communications from the users. The aggregator typically receives from several collectors distinct representations of the reverse channel communications transmitted by a single user. These distinct representations are processed to provide an aggregate signal with enhanced quality over any one of the distinct representations. The aggregation process also yields the user's current location.

A region manager coordinates the functions of all of the zone managers in a region. When a user travels from one zone to another, the region manager directs the handoff procedure whereby one zone manager cedes control of the user forward and reverse communications to a second zone manager. The region manager also functions as a resource manager, optimizing the allocation of system resources over the entire region.

The present invention employs digital signal processing (DSP) resources and allocates them where and when needed to specific processing locations in the communication system. Efficacy and economy are achieved by a process of allocating resources to digital signal processors distributed in the forward and reverse paths. The architecture for and the process of allocating digital signal processing resources in accordance with the invention is applied to wideband radio technology, to spread spectrum technology, and to other multiple access technologies. The invention is capable of real-time adaptation to changes in the system by real-time allocation of processing resources.

The inherent benefits of the wireless operating system allow for increased capacity, coverage, and quality over prior cellular systems. The presence of the collector array allows users to transmit with lower power for a given size zone (since the collectors are closer to users than the base stations in conventional cellular systems), thus increasing coverage by allowing zones larger than conventional cells. The collectors provide signal strength measurements which are used by the zone manager to determine user location for accurate forward and reverse link power control and more efficient frequency reuse, thus improving capacity. The signals from the collectors are aggregated at the aggregator to provide greater communications link quality.

The foregoing and other objects, features and advantages of the invention will be apparent from the following detailed description in conjunction with the drawings.

DETAILED DESCRIPTION

Figure 1:
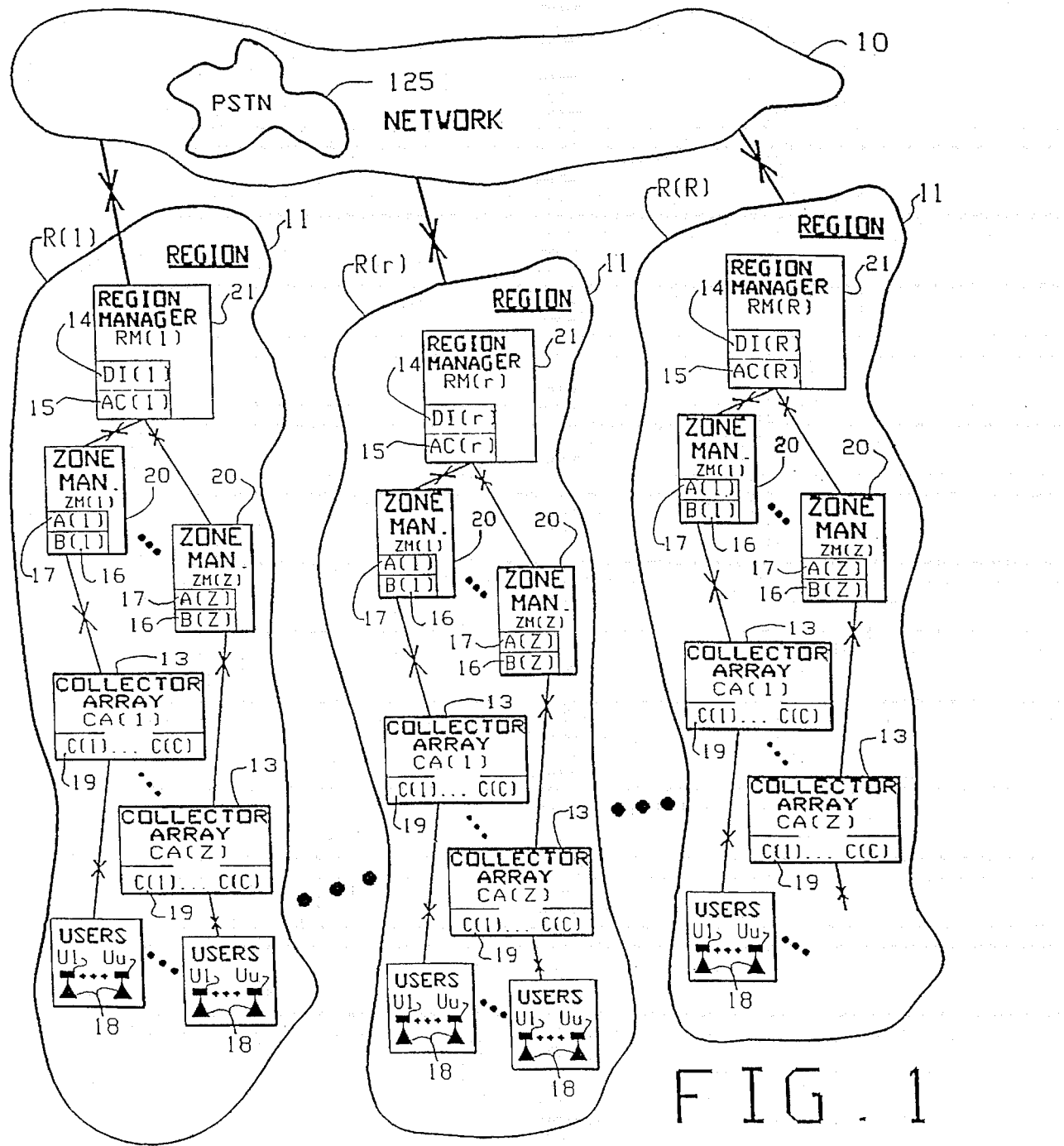
FIG. 1 depicts a communication network connected with two-way communication to a plurality of regions for wireless communication with users.
Figure 2:
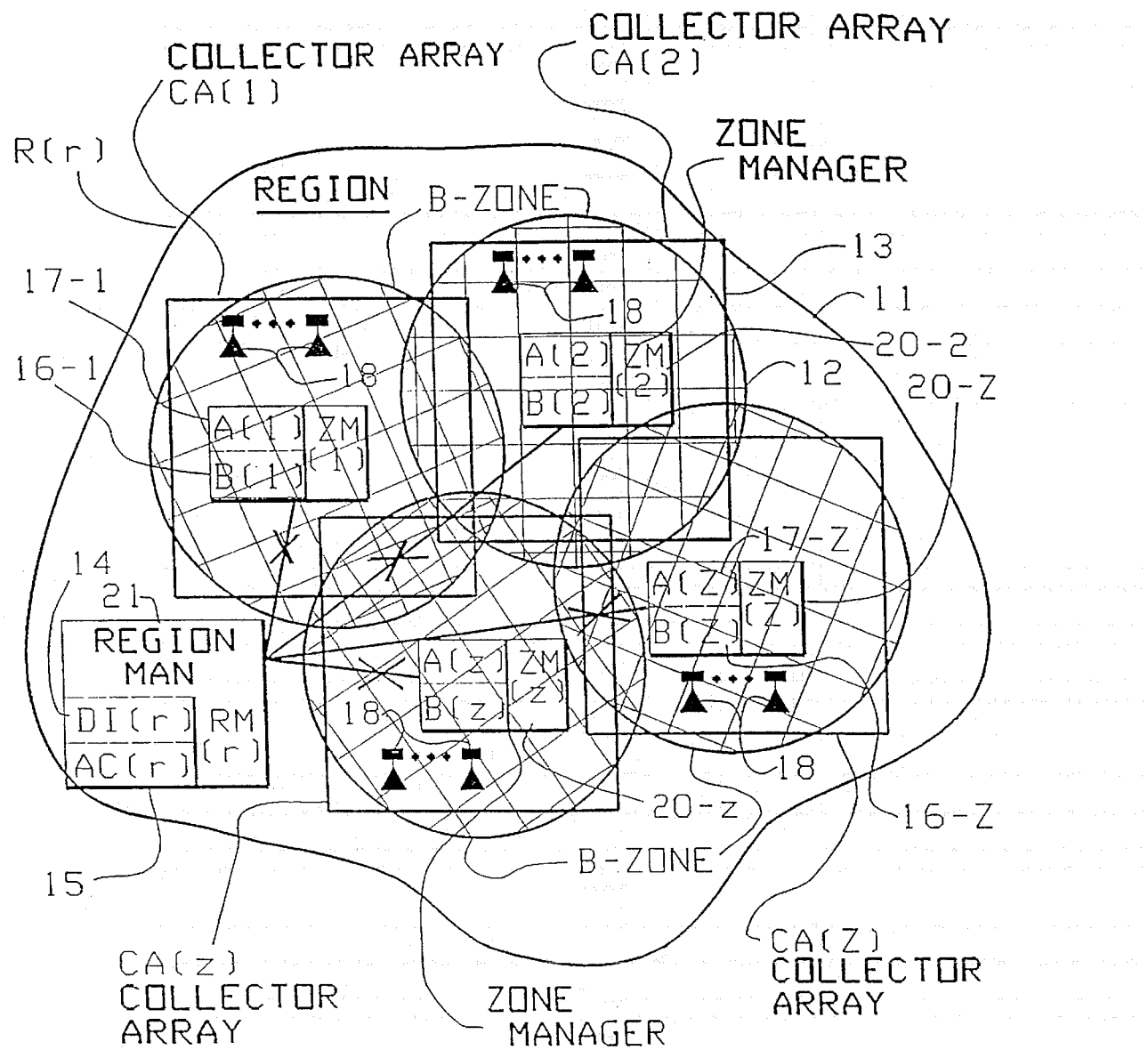
FIG. 2 depicts one of the regions of FIG. 1 that is serviced by a region manager communicating with a plurality of zone managers having broadcasters for forward channel communication to users and having aggregators for receiving reverse channel communications, and that is serviced by a plurality of collector arrays for collecting reverse channel communications from users for forwarding reverse channel communications to aggregators.

System Architecture—FIGS. 1 and 2

Referring to FIG. 1, the architecture of the present invention is based upon one or more geographic regions (R) 11 and a network 10. A region can be any area large or small from entire countries to streets or buildings. Forward channel and reverse channel communications in regions 11 and between regions 11 and network 10 are controlled and established by region managers (RM) 21. The region managers 21 provide system-wide functions such as switching (between regions 11 and the PSTN, for example), user management, such as home location register (HLR) and visitor location register (VLR) functions, roaming support (for example, IS-41 connectivity).

Each region 11 has broadcast zones established by zone managers (ZM) 20. The zone managers 20 have high-powered broadcasters 16 that broadcast the forward channel communication to users (U) 18. The zone managers 20 also include aggregators 17 that process reverse channel communications. Zone managers 20 have the capability of broadcasting using the entire frequency spectrum allocated to the region 11. The users 18 receive, with omni-directional receivers, forward channel communications from the zone managers 20 and transmit reverse channel communications, with omni-directional transmitters, to collectors 19 in collector arrays 13. Each of the collectors 19 for a collector array 13 receives reverse channel communications transmitted by those mobile users 18 within the reception range of the collector. The collectors 19 in collector arrays 13 in turn retransmit the reverse channel communications to an aggregator 17 in the zone manager 20. The zone manager 20 processes the received reverse channel communications and forwards the reverse channel communications to the same source in network 10 that originated the forward channel communications through region switches.

Each zone manager 20 communicates with the region manger 21 which coordinates the frequency allocation for forward and reverse channels among broadcasters, users and collectors.

Referring specifically to FIG. 1, a network 10 represents all of the connected communication systems of the communication universe including, for example, the public-switched telephone network (PSTN) 125. A plurality of service area regions 11 have full duplex connections to the network 10 for providing two-way communication between network 10 and wireless users 18. A total of R regions 11 are shown in FIG. 1 including the regions R(1), R(2), . . . , R(r), . . . , R(R).

Each of the R regions 11 includes a region manager 21 RM(1), RM(2), . . . , RM(r), . . . , RM(R). Each of the region managers 21 includes a distributor (DI) 14 that is a facility in each region 11 for distributing forward channel communications from the network 10 to zone managers 20 that broadcast to wireless telephone users 18 in a region 11. A total of R distributors 14 are shown in FIG. 1 including the distributors DI(1), DI(2), . . . , DI(r), . . . , DI(R).

Each of the region managers 21 includes an accumulator (AC) 15 that is a facility in each region 11 for accumulating reverse channel communications from zone managers 20 and routing reverse channel communications to the network 10. The zone managers 20 receive reverse channel communications from users 18 including users U1, . . . , Uu through collectors 19 including collectors C(1), . . . , C(C) in collector arrays 13. A total of R accumulators 15 are shown in FIG. 1 including the accumulators AC(1), AC(2), . . . , AC(r), . . . , AC(R).

The component parts of the communication system including the region managers 21, the zone managers 20, the collector array 13 and the users 18, are implemented by a combination of software and hardware described in detail hereinafter.

Collectively, the software is known as the wireless operating system and is distributed throughout the component parts of the communication system. A substantial portion of the operating system implements the functions required by the various governmental standards applicable to wireless communication as well as other functions that are otherwise well known. In addition to well-known functions, the present system provides a number of new functions that enhance wireless communication. These new functions will be detailed and illustrated in the following figures. Generally and for one embodiment, the wireless operating system functions are outlined as follows:

Region Manager 21
Interfaces:
  To and from network 10
  To and from zone managers 20
    Narrowband signals from accumulator 15 (status information from multiple aggregators 17)
    Narrowband signals from distributor 14 to broadcasters 16 (control information to multiple broadcasters 16)
Information fields sent by region manager 21 to zone managers 20:
  List of registered mobile users 18 within each zone
  List of permitted broadcaster 16 frequencies
  Power limits for each permitted broadcaster 16 frequency
  Network 10-generated call setup/tear-down requests
  Region manager 21 requests to handle potential handoffs
  Status of previous region manager 21 handoff requests
Information fields received by region manager 21 from zone managers 20:
  Updated list of registered mobile users 18 within each zone
  List of active broadcaster 16 frequencies and associated power levels
  Requests for increased broadcaster 16 frequency allocations
  Requests for increased broadcaster 16 power level limits
  List of active user 18 power levels
  User 18-generated call setup/teardown requests
  Zone manager 20 requests to handle potential handoffs
  Status of previous zone manager 20 handoff requests
Zone Manager 20:
Interfaces:
  Narrowband signal(s) from aggregator 17 (status information from multiple collectors 19)
  Narrowband signal(s) to broadcaster 16 (control information to multiple collectors 19)
Information Fields Sent by Zone Manager 20 to Every Collector 19:
  List of active receive frequencies
  Minimum signal threshold per active receive frequency
  Permission to re-transmit
  For each "permission to re-transmit", a retransmission frequency
Information Fields Received by Zone Manager 20 from Every Collector 19:
  User frequencies and signal strengths
  Broadcast signal measurements
Aggregator 17 Control:
  Active return frequency list (collector 19 to aggregator 17 re-transmission of user 18 signal)
  Aggregation control data
  Routing Information (to network 10, intrazone, interzone)
Broadcaster 16 Control:
  Per-channel broadcast signal power
  Per-channel user 18 transmit power (goes into broadcaster 16 control channel)
Broadcaster 16:
Interfaces:
  Voice and data channels from distributor 14
  Air interface to users 18 and collectors 19
Processing Per Broadcast channel:
  Routing from network 10, interzone, intrazone
  Speech coding
  Air protocol coding
  Modulation
Signal combination:
  Performance gain control on outgoing signals
  Mix outgoing data signals into broadband
  Mix control signals into broadband
Transmission:
  Digital to analog (D/A) conversion
  Intermediate frequency (IF) to radio frequency (RF) conversion
  Antenna feed
Aggreator 17:
Interfaces
  Air interface from collectors 19
  Voice and data channels to accumulator 15
Reception:
  Antenna feed
  RF to IF
  Analog to digital (A/D) conversion
Aggregation:
  Spectral Transform
  Filtering (Channelization)
  Synchronization
  Combination/Selection
  User localization
Processing per Aggregated Channel:
  Demodulation Channel
  Air Protocol Decoding
  Speech decoding
  Routing information (to network 10, intrazone, interzone)
Collector 19:
Interfaces:
  Air interfaces from users 18 and broadcaster 16
  Air interface to aggregator 17
Reception:
  Antenna signal (from user 18)
  Antenna feed from broadcaster signal (control signal from broadcaster 16)
  RF to IF on user 18 and control signals
  A/D conversion on user 18 signal (wideband)
  Demodulate control signal(s)
Detection Processing:
  Spectral Transforms
  Signal strength measurement
  Threshold comparison and peak list generation
Per re-transmitted channel:
  Gain leveling (equalization)
  Frequency translation (received from user 18→sent to aggregator 17)
Signal combination:
  Mix N outgoing data signals into one broad band
  Mix control signals into one broad band
Transmission:
  D/A conversion
  IF to RF conversion
  Directional antenna feed
Communications Region—FIG. 2
FIG. 2 depicts a typical one, R(r), of the regions 11 of FIG. 1. The R(r) region 11 is serviced by a plurality of zone managers 20. Each zone manager 20 includes a broadcaster (B) 16 and an aggregator (A) 17. The broadcasters 16 broadcast over one or more forward channel broadcast ranges that determine the broadcast zones 12. Each broadcaster 16 and aggregator 17 is associated with at least one reverse channel collector array 13. Each broadcaster 16 is a facility for broadcasting forward channel communications to users 18 located within the broadcast zone of the broadcaster 16. A total of Z broadcasters 16 are shown for the region R(r) of FIG. 2 including the broadcasters B(1), B(2), . . . , B(z), . . . , B(Z) where z is a particular one of the broadcasters 16 and z=1, 2, . . . , z, . . . , Z.

Each broadcaster 16 and collector array 13 in region R(r) is associated with at least one aggregator 17 which is a facility for aggregating reverse channel communications from collectors 19 that form the collector array 13. A total of Z aggregators 17 are shown for the region R(r) of FIG. 2 including the aggregators A(1), A(2), . . . , A(z), . . . , A(Z) where z is a particular one of the aggregators 17 and z=1,2, . . . , z, . . . , Z.

Each collector array 13 in FIG. 2 is formed of a plurality of collectors (see collectors 19 in FIGS. 3 and 4) for receiving reverse channel communications transmitted by users 18 and for transmitting reverse channel communications to an aggregator 17. A total of Z collector arrays 13 are shown for the region R(r) 11 of FIG. 2 including the collector arrays CA(1), CA(2), . . . , CA(z), . . . , CA(Z) where z is a particular one of the collector arrays 13 and z=1,2, . . . , z, . . . , Z.

The region R(r) 11 of FIG. 2 includes a plurality of users 18. Each user 18 is a facility, that can be mobile, for receiving and transmitting full duplex communications by receiving forward channel communications from broadcasters 16 and transmitting reverse channel communications to collector arrays 13.

One example of FIG. 2 regions 11 occurs on the San Francisco Bay Area ("Bay Area"). In the Bay Area, four regions can be used to cover an area that is approximately 50 miles by 100 miles (5000 square miles) or approximately 1,250 square miles per region. In the existing AMPS system, each region in the Bay Area has approximately 50 conventional base stations, each base station having transmitters and receivers for broadcasting and receiving. In the AMPS existing system, the forward channel broadcast cell is the same size as the reverse channel receive cell. Of the 416 channels allocated to a provider using the 900 MHz band, between 30 and 60 are available per cell. The capacity demand of the 200,000 current Bay Area subscribers requires about 200 AMPS cells. As the number of active subscribers increases, however, the number of cells and regions must increase in the existing AMPS system.

Although a system in accordance with the present invention can be mapped onto the existing Bay Area cellular system using the same existing four Bay Area regions tiled by twenty broadcast zones, preferably, the Bay Area can be mapped to a single larger region served by a region manager 21 with, for example, thirty zone managers 20 where the zone sizes established by the zone managers 20 are larger than the existing broadcast cells for the existing AMPS cellular system.

A plurality of collectors 19 are used to form a collector array 13 over the areas of cells of a conventional cellular system. In the Bay Area example, if a single region 11 is used to tile the 5000 square mile area, that region can include thirty zone managers 20 with one broadcaster 16 each and one aggregator 17 each and with thirty collector arrays 13 of ten collectors 19 per collector array 13.

Each of the collectors 19 in a collector array 13 includes a high gain, directional transmitter directed at the receive antenna of the aggregator 17. The receiver antenna of the aggregator 17 is a low gain, wide angle antenna, or the aggregator may have multiple directional antennas. With this combination of transmitters and receivers, the forward channel and reverse channel communications equipment is tailored to match the inherently different characteristics of the forward and reverse channels. In addition to the features previously discussed, the broadcaster 16 has variable transmit power which can be varied for each forward channel so that the broadcast range can be different for each user 18. Similarly, each of the users 18 has variable transmit power so that the broadcast range of the reverse channel for each user 18 can be controlled to reach only the collectors 19 in close proximity to the user 18. The broadcaster 16 can optionally use circular polarization to combat fading on the user's 18 omnidirectional antenna, much like FM radio.

Figure 3:
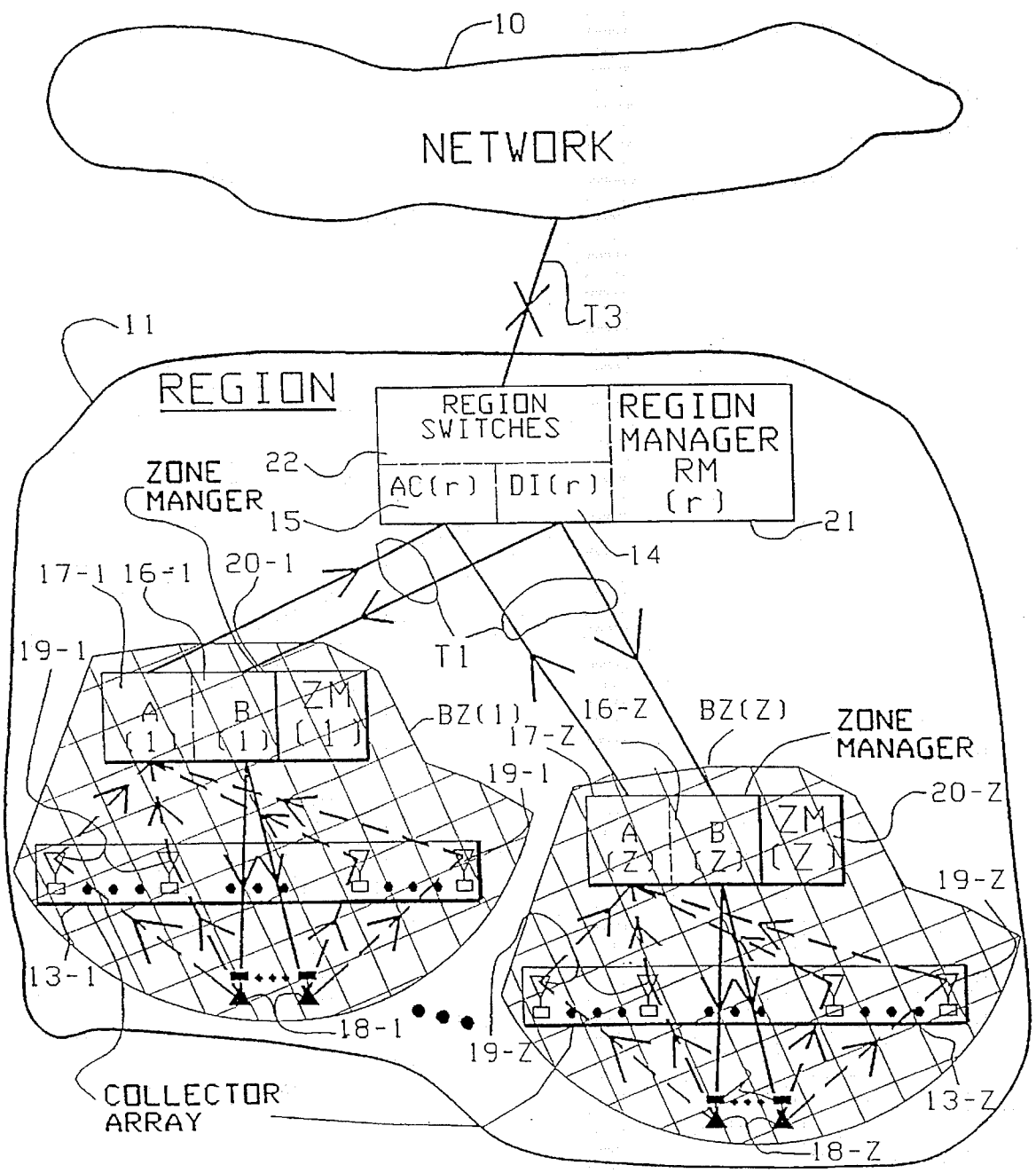
FIG. 3 depicts further details of the FIG. 2 system connecting to a network.

Wireless Communication System—FIG. 3

In FIG. 3, further details of the FIG. 2 system are shown for a single region 11 connected to the network 10. In FIG. 3, the region 11 includes the RM(r) region manager 21 which connects by T3 lines, for example, to the network 10. The region manager 21 includes an accumulator 15 and a director 14 connected together with region switches 22. The region switches 22 switch connections in a conventional telephone switching manner. The region switches 22 are used to provide users 18 with region-to-region connections and to provide users 18 with region-to-network connections.

In FIG. 3, the zone managers 20 include zone managers ZM (1), . . . , ZM(Z). The zone managers 20 each include a broadcaster 16, including the broadcasters B(1), . . . , B(Z). The broadcasters 16 receive the forward channel communications on T1 lines, for example, from the director 14. The B(1) broadcaster 16-1 establishes broadcast zone BZ(1) and the B(Z) broadcaster 16-Z establishes the broadcast zone BZ(Z).

A plurality of users 18-1 are within the broadcast zone BZ(1) and receive the forward channel communications from the B(1) broadcaster 16-1. Each of the users 18-1 provides reverse channel communications to one or more collectors 19-1 of the collector array 13-1 in the broadcast zone BZ(1). The collector array 13-1 in turn continue the reverse channel communications from the users 18-1 to the A(1) aggregator 17-1. The aggregator 17-1 continues the reverse channel communication from the users 18-1, the collectors 13-1 and the aggregator 17-1 over the T1 lines to the AC(r) accumulator 15. The region switches 22 connect the T1 communications from the users in the BZ(1) zone either to users in one of the other zones, such as users 18-Z in the BZ(Z) zone, or to the network 125.

In FIG. 3, the BZ(Z) zone similarly includes a plurality of users 18-Z which receive forward channel communications from the B(Z) broadcaster 16-Z. The users 18-Z in mm broadcast reverse channel communications to the collectors 19 in the collector array 13-Z. Each of the collectors 19-Z in the collector array 13-Z transmit the reverse channel communications to the aggregator 17-Z in the zone manager 20-Z. The zone manager 20-Z then continues the reverse channel communication from the aggregator 17-1 to the AC(r) accumulator 15 in the region manager 21. The region manager 21, through operation of the region switches 22, switches the reverse channel and forward channel communications between the zone manager ZM(Z) and either to users in the other zones, such the BZ(1) zone or to the network 10.

Each of the broadcasters 16 in certain embodiments broadcasts with different power for each channel and hence the broadcast range for some channels will be more or less than for other channels. The terms "broadcast zone" or "broadcaster zone" mean the area covered by the set of broadcast ranges from a broadcaster 16. Because broadcast ranges for channels may be varied on command from a zone manager 20, in general broadcast zones from separate broadcasters 16 will overlap. In a similar manner, each user 18 has variable transmission power and hence the "user zone" is the area reached by the user 18 broadcasting at different ranges at different times.

Figure 4:
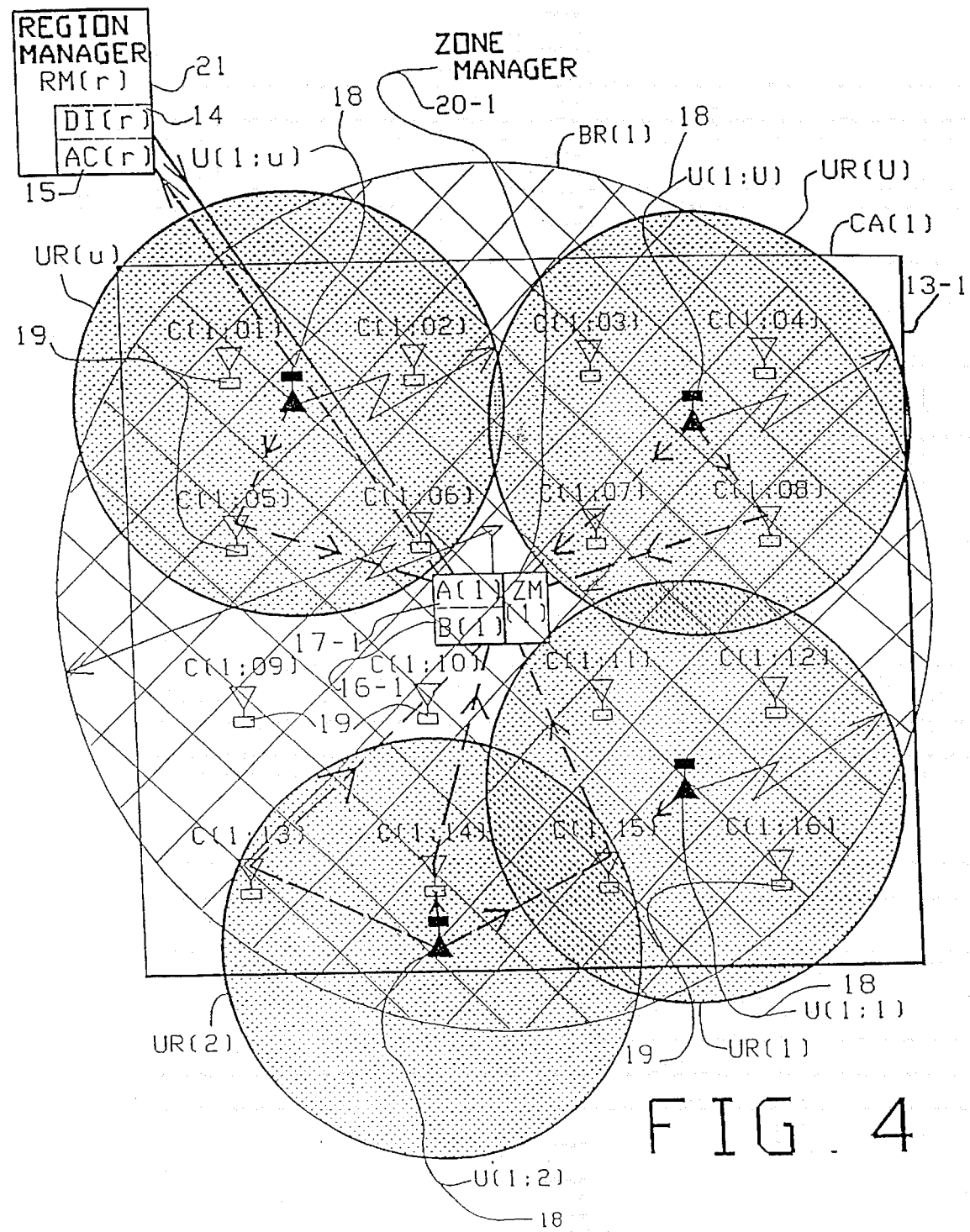
FIG. 4 depicts a system with one zone manager of FIG. 2 for broadcasting forward channel communications to a plurality of users and a corresponding collector array, formed of a plurality of collectors, for receiving and retransmitting reverse channel communications from users.

Single Broadcast Range Example—FIG. 4

In FIG. 4, the ZM(1) zone manager 20-1 of FIGS. 1 through 3 establishes, for example, broadcast range BR-1 for forward channel transmissions to a plurality of users 18.

In FIG. 4, the zone manager 20-1 includes B(1) broadcaster 16-1 which broadcasts over an area designated as the BR(1) broadcast range. Within the BR(1) broadcast range, a plurality of users 18 are designated U(1;1), U(1;2), . . . , U(1;u) , . . . , U(1;U). Each of these users 18 has an omni-directional receiver antenna for receiving broadcasts on the forward channel from the B(1) broadcaster 16 of zone manager 20-1.

Also, each of the users 18 has a transmitter that transmits on the reverse channel establishing for each a user range (UR) that covers a more limited area than that covered by the BR(1) broadcast range. Within the area of the broadcast range BR(1) is located the CA(1) collector array 13-1. The CA(1) collector array 13-1 includes a plurality of collectors 19, and specifically the 16 collectors C(1;01), C(1;02), . . . , C(1;16). The collectors 19 each have omnidirectional receiver antennas for receiving transmissions from users 18 that are in close proximity. For example, the user U(1;1) broadcasts over the UR(1) user range which reaches the collectors C(1;11), C(1;12), C(1;15) and C(1;16). In a similar manner, the user U(1;2) broadcasts over the UR(2) user range which reaches the collectors C(1;13), C(1;14) and C(1;15). Similarly, the user U(1;u) broadcasts over the UR(u) user range which reaches the collectors C(1;01), C(1;02), C(1;05) and C(1;06). Finally, the user U(1;U) broadcasts in a UR(U) user-range which reaches the collectors C(1;03), C(1;04), C(1;07) and C(1;08). Each of the collectors 19 in the CA(1) collector array 13-1 of FIG. 4 in addition to receiving the broadcast reverse channel communications from users 18 as indicated, also transmits to an A(1) aggregator 17-1 of the ZM(1) zone manager 20.1. The ZM(1) zone manager 20-1 in turn 1 communicates reverse channel communications from A(1) aggregator 17-1 to the AC(r) accumulator 15 in the RM(r) region manager 21. Similarly, the B(1) broadcaster 16-1 in the ZM(1) zone manager 20-1 receives forward channel communications from the DI(r) director 14 in the region manager 21.

In FIG. 4, the zone manager 20-1 determines the particular ones of the collectors 19 in the associated collector array 13-1 that are selected to be active to receive and retransmit reverse channel communications to particular ones of the users U(1;1) through U(1;U). The selection is implemented, for example, by zone manager control code which accesses quality measurements for the aggregated reverse channel and signal strength measurements from the collector array to determine the optimal set of collectors to retransmit, and to update the permission status of the collectors as required. One embodiment of such control code is contained in TABLP 1, implemented in the MATLAB programming language.

TABLE 1

© COPYRIGHT 1995 SPECTRUM WIRELESS, INC.

```
%   This script performs zone manager control of collectors. It queries the zone
%   manager data base to determine the quality of each aggregated reverse channel
%   communication link. In the case of insufficient quality it either changes the
%   specification of collectors returning the signal, increases if possible
%   the number of collectors returning a signal to the aggregator or increases
%   the mobile broadcast power. In the case of excessively high quality it either
%   drops a collector return or decreases the mobile broadcast power level.
%   Algorithm parameters are the minimum and maximum merit values for signal
%   quality and the minimum and maximum number of collectors that may return
%   signals
MinMerit = 18;
MaxMerit = 22;
MinColl = 2;
MaxColl = 5;
ActiveChannel = Channel(find(ChannelStatus == 1) );
Nactive = length(ActiveChannel);
for ii = 1:Nactive
        User = MobID(ActiveChannel(ii));
        Merit = AggSigQual(ActiveChannel(ii));
        NumColl = sum(CollStatus(ActiveChannel(ii),:);
        Power = MobPower(ActiveChannel(ii));
        if ( Merit < MinMerit)
                [CollMerit, CollRanking] = sort(CollRSSI(ActiveChannel(ii),:));
                GoodEnough = find(CollMerit > MinMerit - 10);
                Ngood = length(GoodEnough);
                CollMerit = CollMerit(GoodEnough);
                CollRanking = CollRanking(GoodEnough);
                if (Ngood < MinColl)
                        IncreasePower(User);
                elseif ( Ngood <= MaxColl)
                        CollStatus(ActiveChannel(ii),:) = zeros(NCOLL);
                        CollStatus(ActiveChannel(ii) ,CollRanking) = ones(Ngood);
                else
                        CollStatus(ActiveChannel(ii),:) = zeros(NCOLL);
                        CollStatus(ActiveChannel(ii),CollRanking(1:MaxColl))    = ones(MaxColl);
                end;
```

TABLE 1-continued

© COPYRIGHT 1995 SPECTRUM WIRELESS, INC.

```
    elseif ( Merit > MaxMerit)
            [CollMerit, CollRanking] = sort(CollRSSI(ActiveChannel(ii),:));
            GoodEnough = find(CollMerit > MinMerit - 10);
            Ngood = length(GoodEnough);
            CollMerit = CollMerit(GoodEnough);
            CollRanking = CollRanking(GoodEnough);
            if ( Ngood > MaxColl)
                    DecreasePower(User);
            elseif ( Ngood > MinColl)
                    CollStatus(ActiveChannel(ii),:) = zeros(NCOLL);
                    CollStatus(ActiveChannel(ii),CollRanking) = ones(Ngood);
            end;
    end;
end;
```

Based upon historical measurements of many users as a function of user location in the collector array zone, a gradient map stores signal strength variations between weak-receive and strong-receive locations. In the weak-receive locations, a greater number of collectors 19 are employed to combine multiple signals through different collectors 19 for the same user 18. With such combining, the signal-to-signal interference is enhanced particularly at inherently weak reception locations in a zone.

Figure 5:
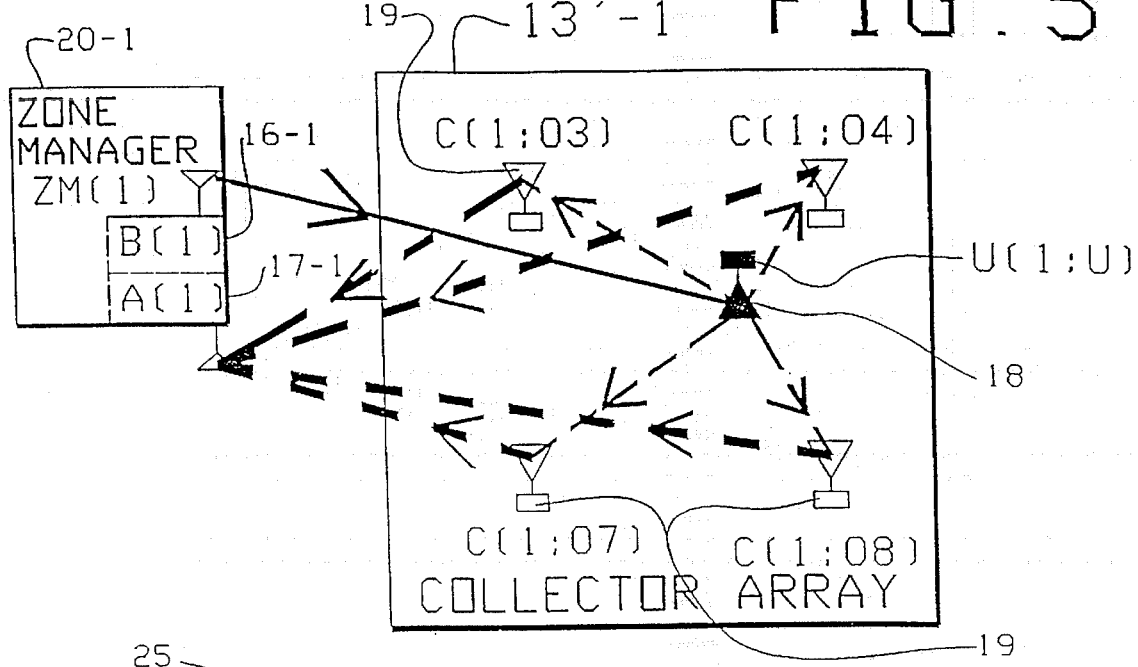
FIG. 5 depicts a schematic representation of further details of the FIG. 4 system with forward channel communication from a broadcaster to a single user and the reverse channel communication from the single user through four collectors to an aggregator.

Single User Example—FIG. 5

In FIG. 5, a schematic representation is shown of the forward channel communication from a B(1) broadcaster 16-1 to the single user U(1;U) of FIG. 4. A portion 13'-1 of the collector array 13-1 of FIG. 4 is shown as the C(1;03), C(1;04), C(1;07) and C(1;08) collectors 19 in FIG. 5. Each of the collectors 19 receives a reverse channel communication from the user U(1;U). Each of the collectors 19 in turn transmits a reverse channel communication to the A(1) aggregator 17-1 in the ZM(1) zone manager 20-1.

In FIG. 5, the transmitter of the B(1) broadcaster 16-1 is a high-gain, omni-directional (or a sectored) antenna. The U(1;U) user 18 has both a omni-directional receiver and an omni-directional transmitter which are typically both low power since typically the user is battery operated and mobile. Each of the collectors 19 typically has an omni-directional receiver antenna of low gain. Each of the collectors 19 typically may include two or more receiver antennas for spatial diversity. Each of the collectors 19 includes a high-gain, directional transmitter directed at the receive antenna of the A(1) aggregator 17-1.

Figure 6:
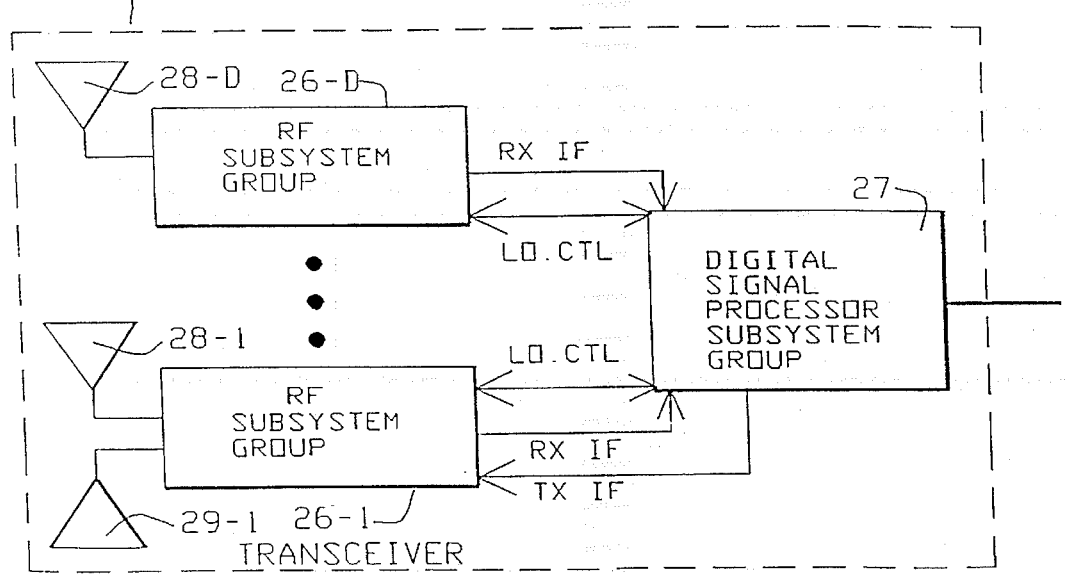
FIG. 6 depicts a generalized block diagram of a digital transceiver (transmitter/receiver).

Digital Transceiver—FIG. 6

FIG. 6 depicts a block diagram of a digital transceiver (transmitter/receiver) 25 which is used as a building block in the communication system of the present invention. In FIG. 6, the transceiver 25 includes RF subsystem groups 26-1, . . . , 26-D and a digital signal processor subsystem group 27. The RF subsystem group 26-1 includes a receiver antenna 28-1 and a transmitter antenna 29-1 for receiving and transmitting RF signals, respectively. Other ones of the RF subsystem groups, such as group 26-D, include only receiver antennas such as antenna 28-D. The RF subsystem groups 26-1, . . . , 26-D interconnect with the digital signal processor subsystem group 27 with a digital interface which includes control signals for local oscillator control (LO. CTL) and includes receiver intermediate frequency (RX IF) signals and transmitter intermediate frequency (TX IF) signals.

Figure 7:
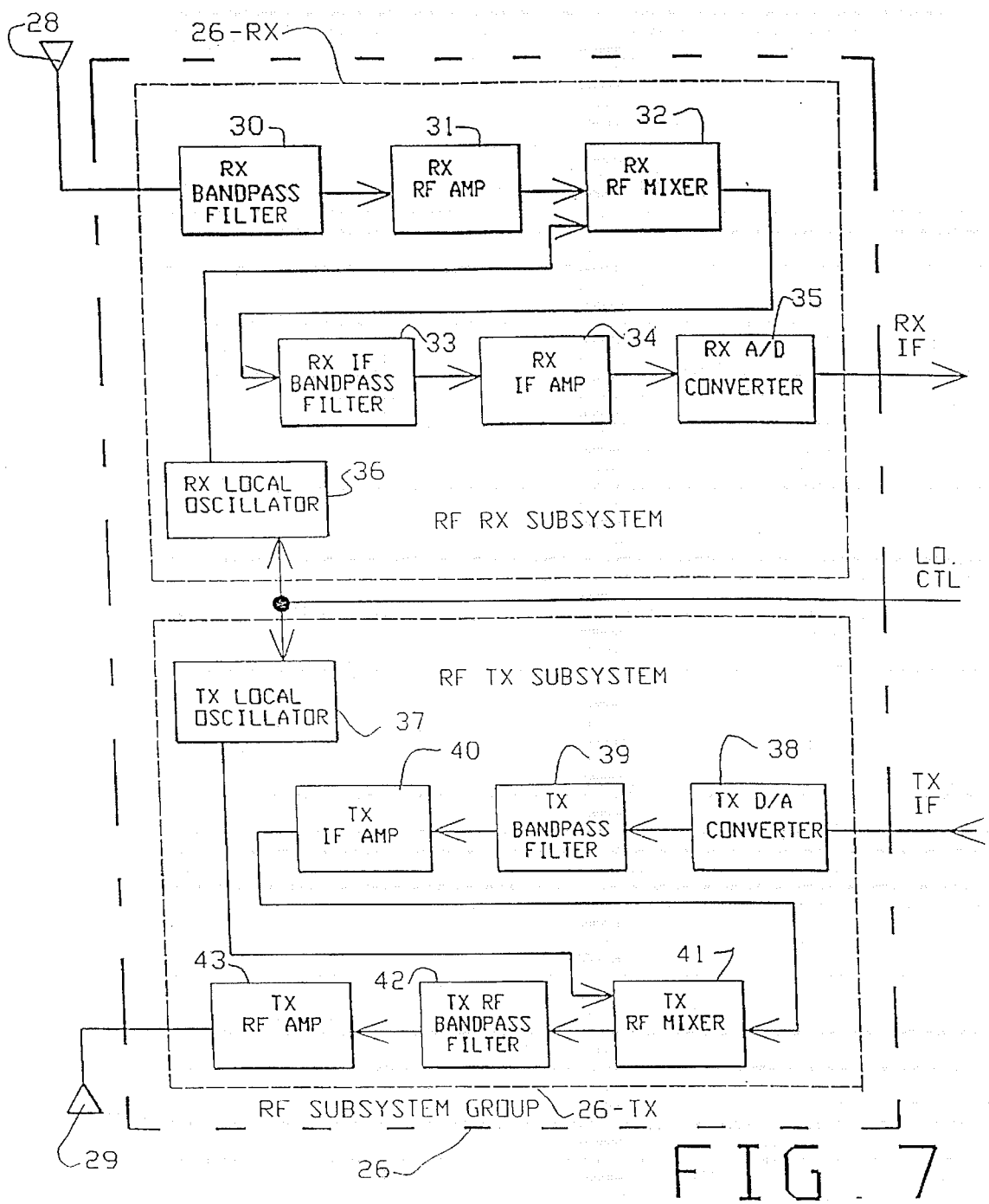
FIG. 7 depicts a block diagram of a RF subsystem group that forms part of the transceiver of FIG. 6.

RF Subsystem Group—FIG. 7

In FIG. 7, a block diagram of an RF subsystem group 26 that forms part of the transceiver 25 of FIG. 6 is shown. The subsystem group 26 includes an RF RX subsystem 26-RX and includes an RF TX subsystem 26-TX. The receiver subsystem 26-RX receives RF communications on the one or more receive antennas 28, combines them in a multiplexer and inputs them to an RX bandpass filter 30. Bandpass filter 30 in turn connects to the RX RF amplifier 31 which in turn connects to an RX RF mixer 32. The mixer 32 receives the RF signal from the amplifier 31 and mixes it with a local oscillator signal from the RX local oscillator 36 in order to down convert the received signal from the RF range to the IF range. The IF range signal from the mixer 32 connects as an input to the RX IF band pass falter 33 which in turn connects to the RX IF amplifier 34 which in turn connects to the RX A/D converter 35. The converter 35 converts the IF signal from the amplifier 34 to a digital signal to provide the digital RX IF output signal which connects to the digital signal processor subsystem group 27 of the type shown in FIG. 6.

In FIG. 7, the RF TX subsystem 26-TX receives the TX IF signal from the digital signal processor subsystem group 27 of the type shown in FIG. 6 and processes the signal for one or more transmissions by the transmitter antenna 29.

The TX IF signal from the digital signal processor subsystem group 27 of the type shown in FIG. 6 is connected to a D/A converter 38 which in turn connects to a TX bandpass falter 39 which in turn connects to TX IF amplifier 40. The amplified TX IF signal from amplifier 40 is input to the TX RF mixer 41. The TX RF mixer 41 receives a local oscillator signal from the TX local oscillator 37 to shift the IF signal to an RF signal. The RF signal from the mixer 41 is input to the TX RF bandpass filter 42 which in turn connects to the TX RF amplifier 43. The amplified signal from the amplifier 43 connects to the one or more transmitter antennas 29.

In FIG. 7, the RX local oscillator 36 and TX local oscillator 37 connect via the LO.CTL control lines to the digital signal processor group 27 of the type shown in FIG. 6 for controlling the particular local oscillator frequencies used by the subsystems 26-RX and 26-TX.

Figure 8:
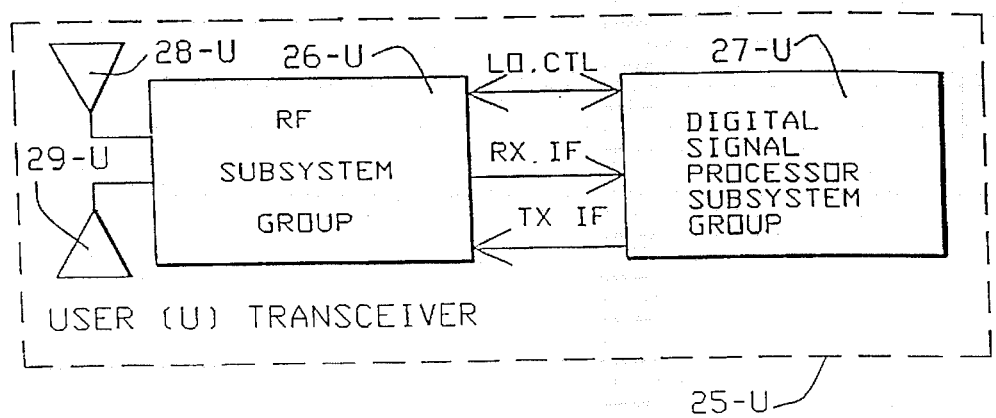
FIG. 8 depicts a block diagram of one embodiment of the digital signal processor subsystem of FIG. 6 for use as a user in FIG. 4.

User Transceiver—FIG. 8

In FIG. 8, a block diagram of a user transceiver 25-U is shown which is generically like the transceiver of FIG. 6. In FIG. 8, the transceiver 25-U is generally of low power and battery operated. The receiver antenna 28-U and the transmitter antenna 29-U are omni-directional. Specific details of one embodiment of user transceiver 25-U manufactured by Harris Semiconductor is described in the DSP Applications, December, 1993, pp15–28 entitled, *Considerations in the Development of a Low Cost High Performance Receiver Based on DSP Techniques*.

Figure 9:
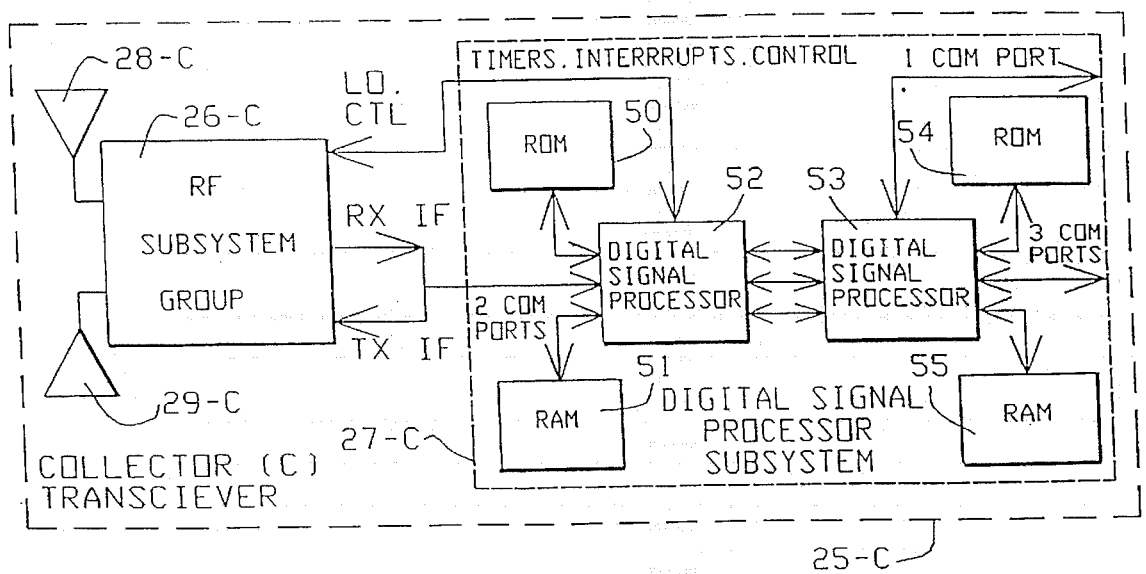
FIG. 9 depicts a block diagram of one embodiment of the transceiver of FIG. 6 for use as a collector in FIGS. 3, 4 and 5.

Collector Transceiver—FIG. 9

In FIG. 9, a block diagram of a collector transceiver 25-C is shown which is representative of one embodiment of the transceivers of the collectors 19. The collector transceiver 25-C includes one or more receiver antennas 28-C and one or more transmitter antennas 29-C. Antennas 28-C and 29-C are connected to the RF subsystem group 26-C. The RF subsystem 26-C connects to the digital processor subsystem 27-C. The collector transceiver 25-C is of the same general form as the transceiver of FIG. 6. The digital processor subsystem 27-C of FIG. 9 in one embodiment is, for example, a digital signal processor (DSP) manufactured by Spectrum Signal Processing as the MDC40T Dual C40 DSP Module. That module features 250 MFLOPS TMS 320C40 parallel digital signal processors 52 and 53 which comply with the Texas Instruments (TI) TIM-40 module standard. The processor provides 6-channel DMA (direct memory access) controller support for concurrent input/output, independent of and in parallel with the central processing units (CPU).

The digital signal processor subsystem 27-C of FIG. 9 permits the processing of the low power, omni-directional receive signals from the receiver antennas 28-C.

For example, such processing under one embodiment of the invention involves a discrete Fourier transform (DFT) filter bank to separate, equalize, and re-pack channels for retransmission. In this process, a representation of the power spectral density for each channel is obtained periodically. Under another embodiment, spread spectrum modulation is used to prepare the signals for retransmission.

A simple embodiment of the collector transceiver 25-C contains only an RF subsystem group 26, and shifts (transponds) an entire broadband signal to a higher or lower frequency range without channelization.

Figure 10:
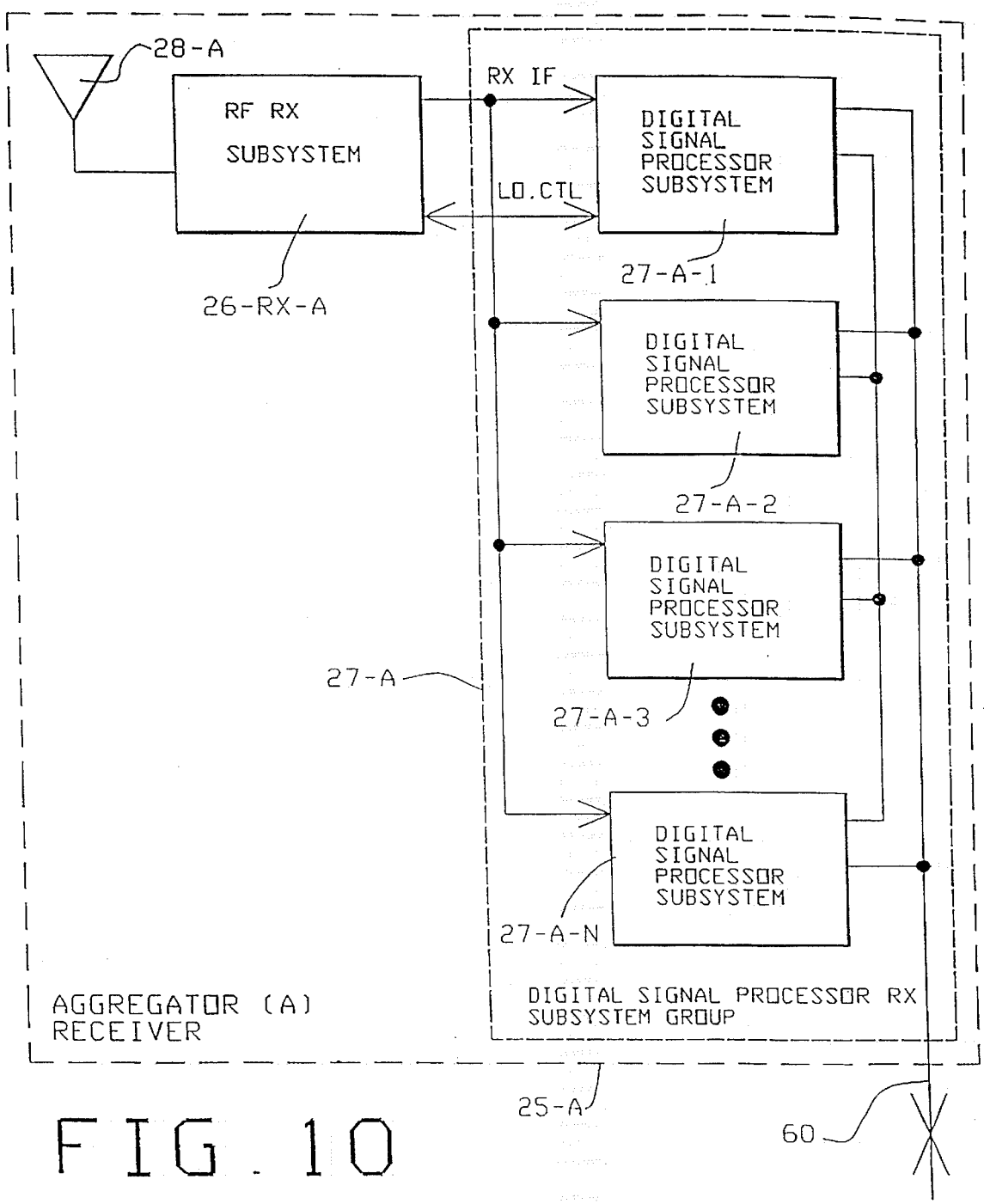
FIG. 10 depicts a block diagram of one embodiment of a receiver portion of the FIG. 6 transceiver for use as an aggregator in FIGS. 3, 4 and 5.

Aggregator Receiver—FIG. 10

In FIG. 10, a block diagram of the aggregator receiver 25-A is shown which is the receiver portion of the transceiver 25 of the FIG. 6 type, since it includes only a receive antenna 28-A and no transmitter antenna. The receive antenna 28-A connects to the RF RX subsystem 26-RX-A which provides digital IF received signals to the digital signal processor subsystems 27-A-1, 27-A-2, 27-A-3, ..., 27-A-N. The digital signal processor (DSP) subsystems 27 in FIG. 10 are each like the digital signal processor subsystem 27-C of FIG. 9 connected together with a daughter module such as AES/EBU daughter module from Spectrum Signal Processing. The RX IF signal from the subsystem 26-RX-A is input to each of the subsystems 27-A-1 through 27-A-N. The aggregator receiver 25-A supports the low gain, wide angle antenna 28-A for receiving collector signals from a plurality of collector transmitters of the type previously described.

The DSP subsystem 27 in FIG. 10, under one embodiment of the invention, uses DFT filter banks along with auto-correlation to synchronize in time and phase the received signals from a plurality of collectors for each user reverse channel transmission. The use of filter banks allows this task to be simultaneously performed for many user transmissions.

Once the plurality of signals representing a single user reverse channel have been synchronized, they are combined (aggregated) by one of several techniques. For example, equal gain or maximal ratio combining, or selection based upon channel strength measurements reported by the separate collectors are employed.

The channel strength measurements reported by the separate collectors are used with time-delay and phase-shift information obtained in the synchronization process to localize (locate) a user within a zone.

Signal Quality Improvement By Aggregation:

The cellular radio propagation environment is characterized by multipath reception of both forward and reverse channel communications. Reflections of a broadcast radio signal in either the forward or reverse direction arrive at the reception point closely spaced in time and perhaps shifted in phase. The resulting interference patterns vary rapidly with spatial location and have a coherence length on the order of the carrier wavelength. The distribution of observed interference ("fades") has been shown to be well-approximated by the Rayleigh distribution. The distribution of fade depths runs from as much as −30 dB to 10 dB. Cellular providers must include "fading margins" in their propagation model-based system planning to account for this fading. Conventional cellular systems remove some Rayleigh fading effects by employing standard diversity combining techniques using two spatially separated base station receiver antennas with spacing small compared to the size of a broadcast cell radius. The resulting two-branch diversity gains are typically 5 to 7 dB.

A second kind of fade is caused by the presence of regions of higher than average (or lower than average) propagation path loss on a particular propagation path. These losses may be caused by terrain features, such as an obscuring hill between the broadcast and reception antennas, or by man-made features such as buildings and freeway structures. Shadow fading at a particular receiver changes slowly as a mobile user moves past the obstructions. For reception at any particular receiver, the distribution of shadow fading has been experimentally found to be log-normal with a variance of 6 to 12 dB for most propagation environments. The variance tends to be higher in open areas than in urban areas and, within urban areas, increases with average building height.

Conventional cellular implementations have no remedy for this fading, and providers must allocate fading margins in system planning to account for shadow fading. Given a signal-to-noise ratio necessary for any particular quality of communications for any particular cellular implementation, a shadow fading margin of, for example, 12.1 dB must be added to achieve that quality over 98% of a cell in the presence of shadow fading of 8 dB variance.

The quality of the reverse channel signal from a user is significantly improved by the aggregation of the plurality of signals returned by the collectors of the present invention. This is due to the amelioration of both fading effects discussed above.

The Rayleigh fading is reduced by the larger-than-wavelength spacing of the collectors, just as in the case of multiple base station receive antennas. Shadow fading is due to the obscuration of users by large-scale terrain features or buildings. The collectors of the present invention are spaced throughout the broadcast range so that at all times at least one collector can be expected to have an unobscured path to any given user. The shadow fading seen at various collectors for a given user is essentially uncorrelated. Thus, the aggregation of the signal will be able to greatly reduce the required shadow fading margin. For example, given a signal-to-noise ratio necessary for any particular quality of communications for any particular cellular implementation, a shadow fading margin of only 0.8 dB must be added to achieve that quality over 98% of a cell in the presence of shadow fading of 8 dB variance. This addition is an improvement of 11.3 dB over the shadow fading margin addition required for conventional cellular systems without collector arrays.

Conventional cellular systems which digitally modulate and encode signals for communications channels express channel quality measurements in terms of the uncoded bit-error rate (BER). A commonly used value for "acceptable" voice quality is a BER of about 0.02 (see, for example, "Wireless Digital Communications, Modulation and Spread Spectrum Applications", Kamilo Feher, Prentice Hall PTR, New Jersey, 1995). The signal-to-noise ratio (SNR) required to achieve this BER varies according to the modulation technique employed. For the quadrature phase-shift keying (QPSK) technique, in the presence of Rayleigh fading but no shadow fading, a SNR of 9 dB is required, but for shadow fading of 12 dB variance, a ratio of 20 dB is required. (see "Probability of Bit Error for MPSK Modulation with Diversity Reception in Rayleigh Fading and Log-Normal Shadowing Channel, W.-P. Yung, IEEE Trans. on Comm., vol. 38, no. 7, 1990, pg. 933–937). Thus an 11 dB fading margin is required. The lower the required BER, the larger this fading margin becomes. For QPSK modulation, a BER of 0.0001 requires a SNR of about 34 dB in the absence of shadow fading. In a 12 dB variance shadow fading environment, the additional fading margin is 18 dB.

The requirement for a large fading margin in conventional cellular systems substantially reduces the size of a cell, or, if not satisfied, reduces the quality of communications within that cell. As an example, consider a user that can broadcast with a maximum of 800 mW effective radiated power in a digital standard-based conventional cellular system in an urban setting. Assume that a SNR of 13 dB is required for acceptable voice communications. Without a fading margin, the Hata propagation model indicates that acceptable voice quality can be sustained to a distance of about 3.3 km. In 12 dB variance shadow fading, this range drops to 1.6 km. If a BER of 0.0001 is required, the range is 0.84 km without a shadow fading margin, and 0.25 km with a shadow fading margin of 18 dB. Data transmission typically requires lower BER values than voice for acceptable performance. This implies that data transmission rates in conventional cellular systems will remain slow, or that extremely dense networks of small cells will be deployed, at great expense. The present invention allows for the near elimination of shadow fading margins from performance planning, greatly increasing communications range or greatly increasing communications quality for the same range.

Figure 11:
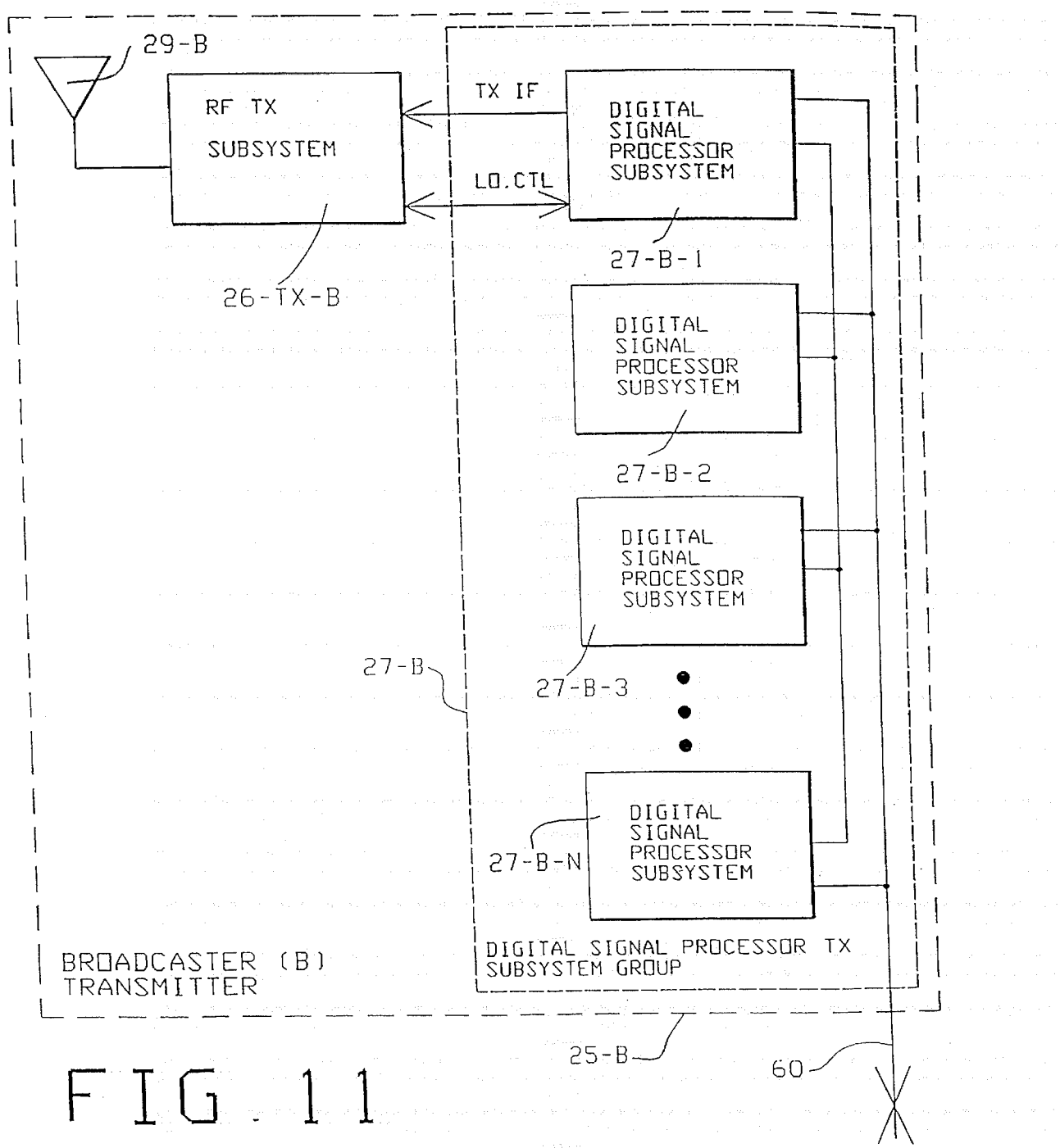
FIG. 11 depicts a block diagram of one embodiment of a transmitter potion of the FIG. 6 transceiver for use as a broadcaster in FIGS. 3, 4 and 5.

Broadcaster Transmitter—FIG. 11

In FIG. 11, the broadcaster transmitter 25-B is a portion of the transceiver 25 of FIG. 6 since it only includes a transmit antenna 29-B and no receive antenna. In FIG. 11, the digital signal processor TX subsystem group 27-B receives signals to be processed on inputs 60 to the digital signal processor subsystems 27-B-1, 27-B-2, 27-B-3, ..., 27-B-N. The DSP subsystems 27-B-1 through 27-B-N process the signals and form the TX IF signal to the RF TX subsystem 26-TX-B. The RF signal from the subsystem 26-TX-B connects to the transmitter antenna 29-B and broadcasts signals to users. The digital signal processing subsystem group 27-B performs speech coding, modulation, and power control on individual channels, then combines them for broadband transmission.

Figure 12:
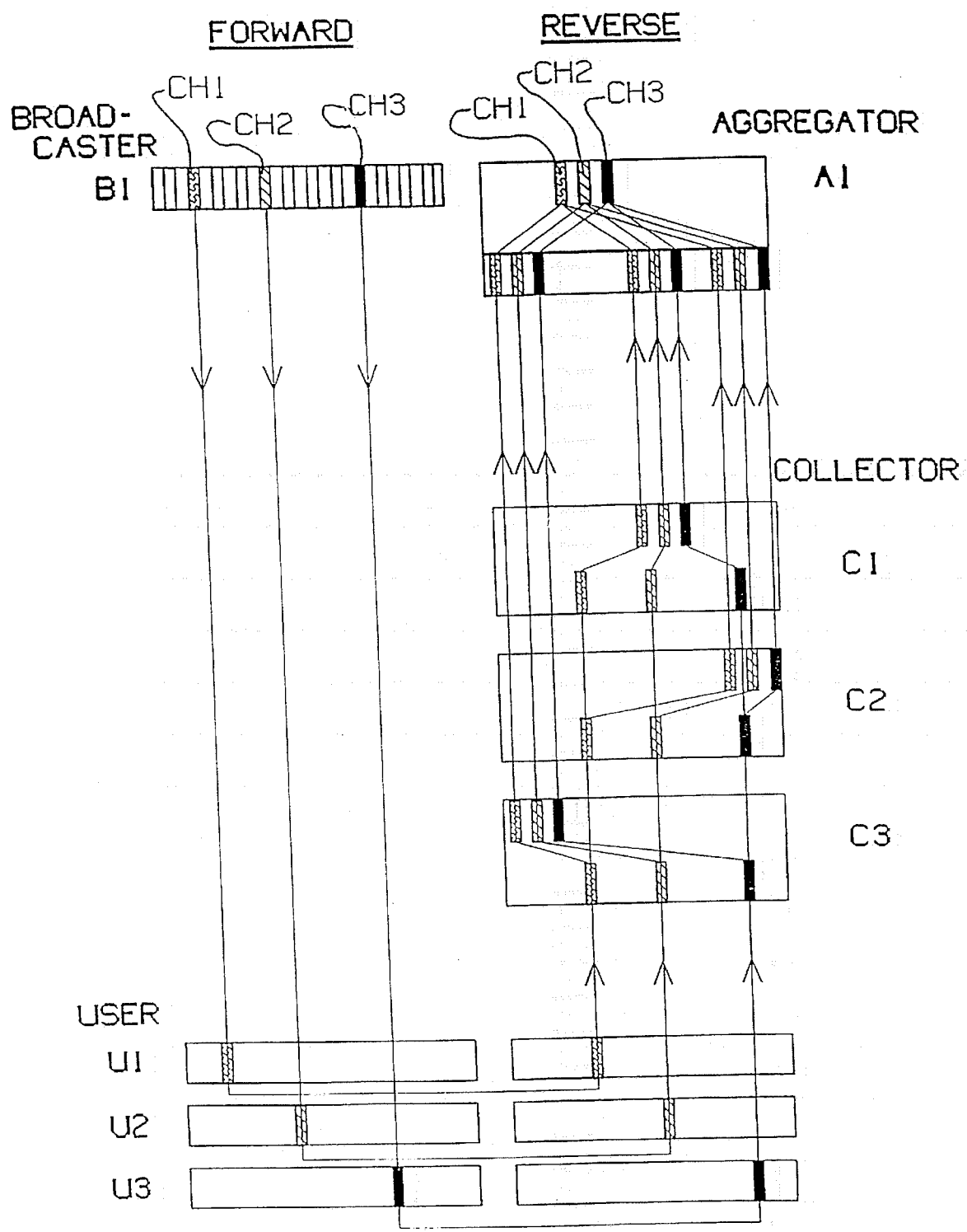
FIG. 12 depicts one embodiment of the full-duplex communication path established to three users, with collectors which shift potions of the allocated reverse channel spectrum to isolate reverse channel transmissions to the aggregator.
Figure 13:
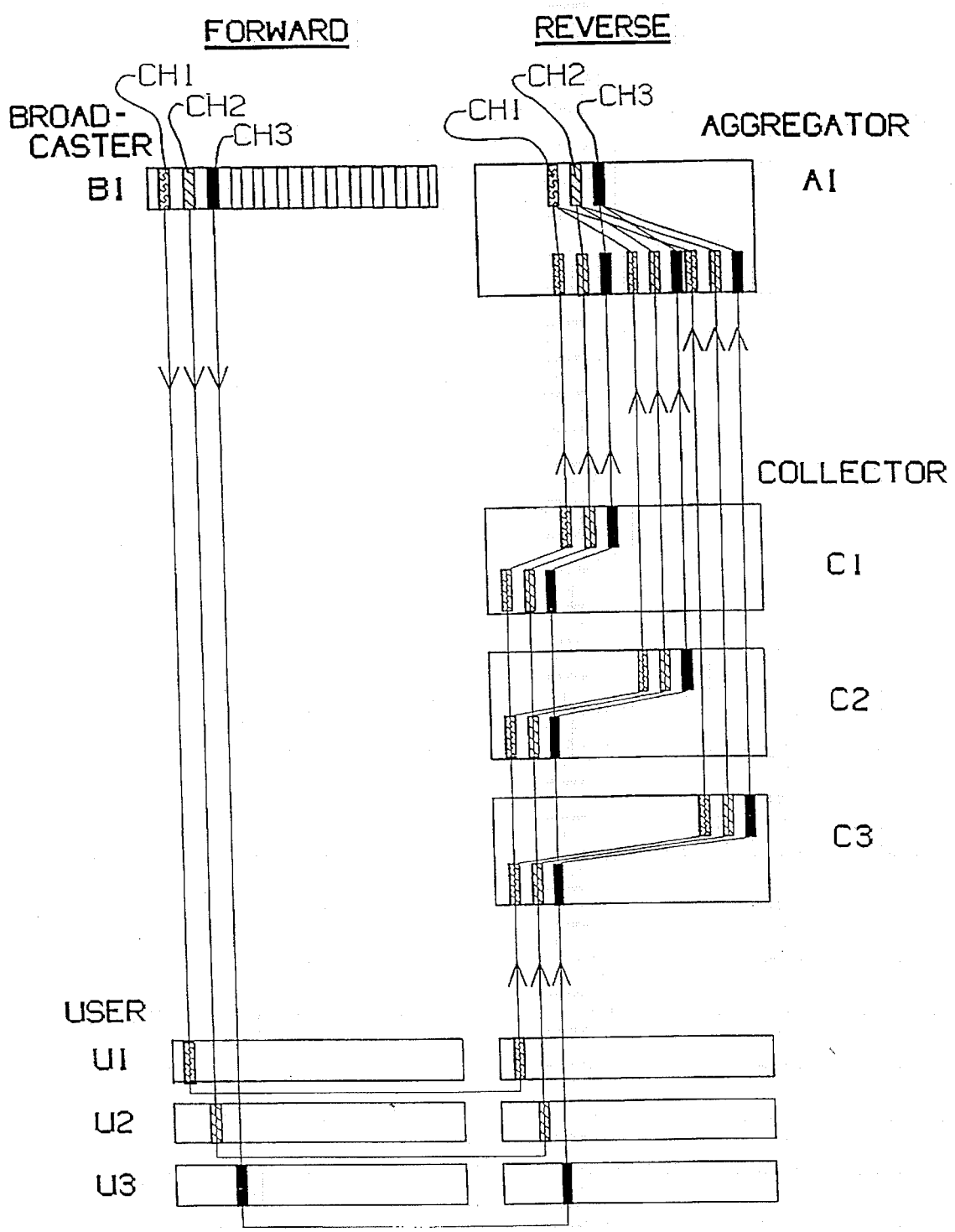
FIG. 13 depicts a second embodiment of the full-duplex communication path established to three users, with collectors which shift individual carriers within the allocated reverse channel spectrum to isolate reverse channel transmissions to the aggregator.

Full-duplex Communication Implementations—FIGS. 12 and 13

Figure 14:
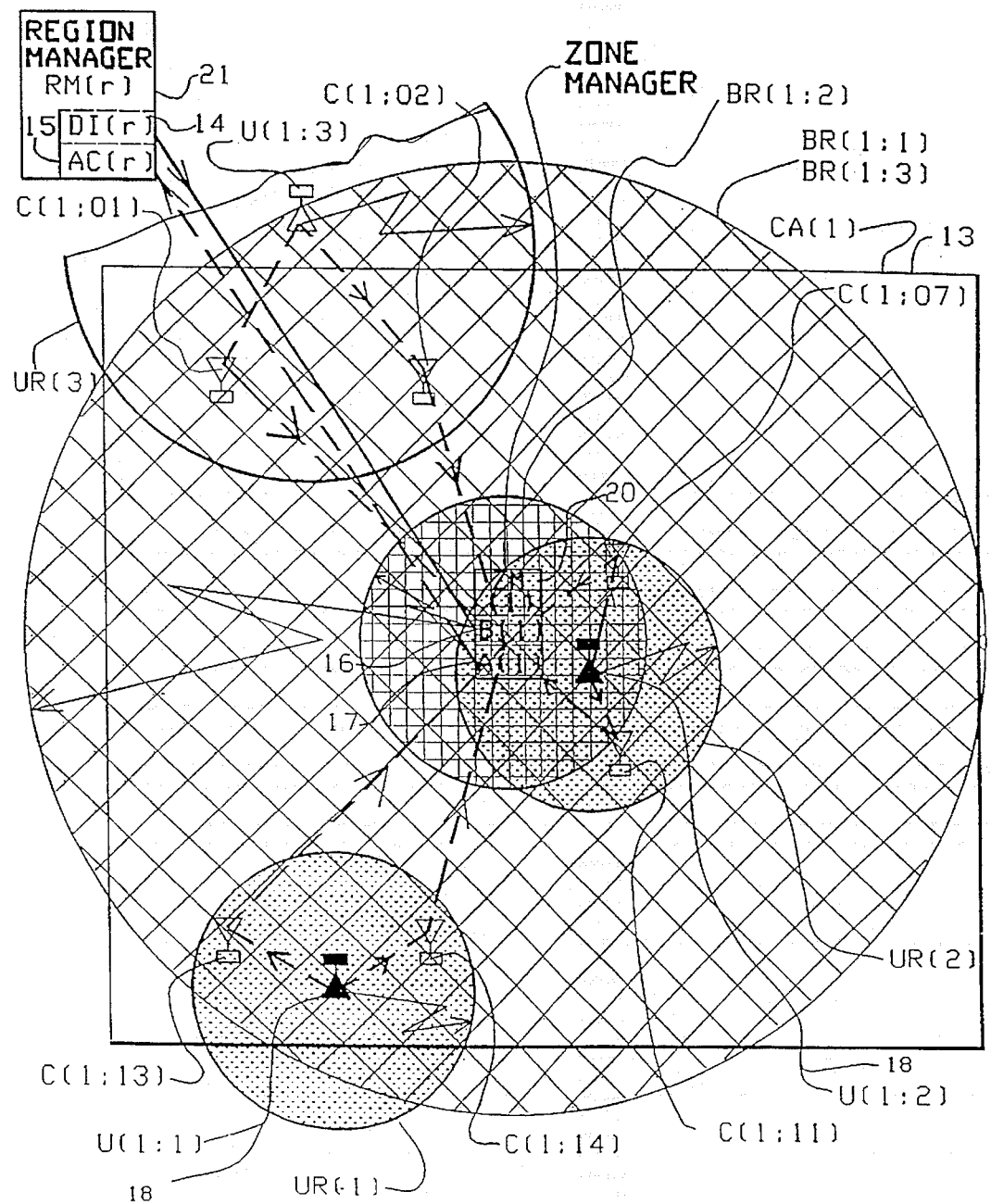
FIG. 14 depicts one zone manager of the FIGS. 2, 3 and 4 type with a broadcaster using three broadcast ranges for broadcasting forward channel communications to three users and a corresponding collector array having a plurality of collectors for receiving and retransmitting reverse channel communications from the three users to an aggregator of the zone manager.

Using the broadcaster, user, collector and aggregator components of the present invention, a full-duplex communications path to a user is established. One implementation of the full-duplex communications channels to three users U1, U2, U3 in a zone is shown in FIG. 14. The three forward channels CH1, CH2, and CH3 begin at the broadcaster B1, with a forward channel broadcast to each user over distinct forward carriers. The users reply with reverse channel broadcasts over the paired distinct reverse carriers. These reverse channel broadcasts are received at each of three collectors C1, C2, and C3 in a collector array of the zone. Each collector shifts, by analog or digital means, the portion of the reverse carrier spectrum containing the three user reverse channel carriers to a portion of the allocated reverse channel spectrum that is distinct both from the received user signals and from the portions of the allocated reverse channel spectrum to which other collectors will shift the received user signals. Each collector broadcasts the shifted carriers in a composite broadband signal to the aggregator A1. The aggregator then processes the received representations of each user's reverse channel signals, synchronizing them to a standard time base, measuring the received signal strength of each representation, and performing either selection-based or combining-based aggregation. The aggregated signal for each user then serves as the reverse channels CH1, CH2, and CH3 of the full-duplex path.

Figure 15:
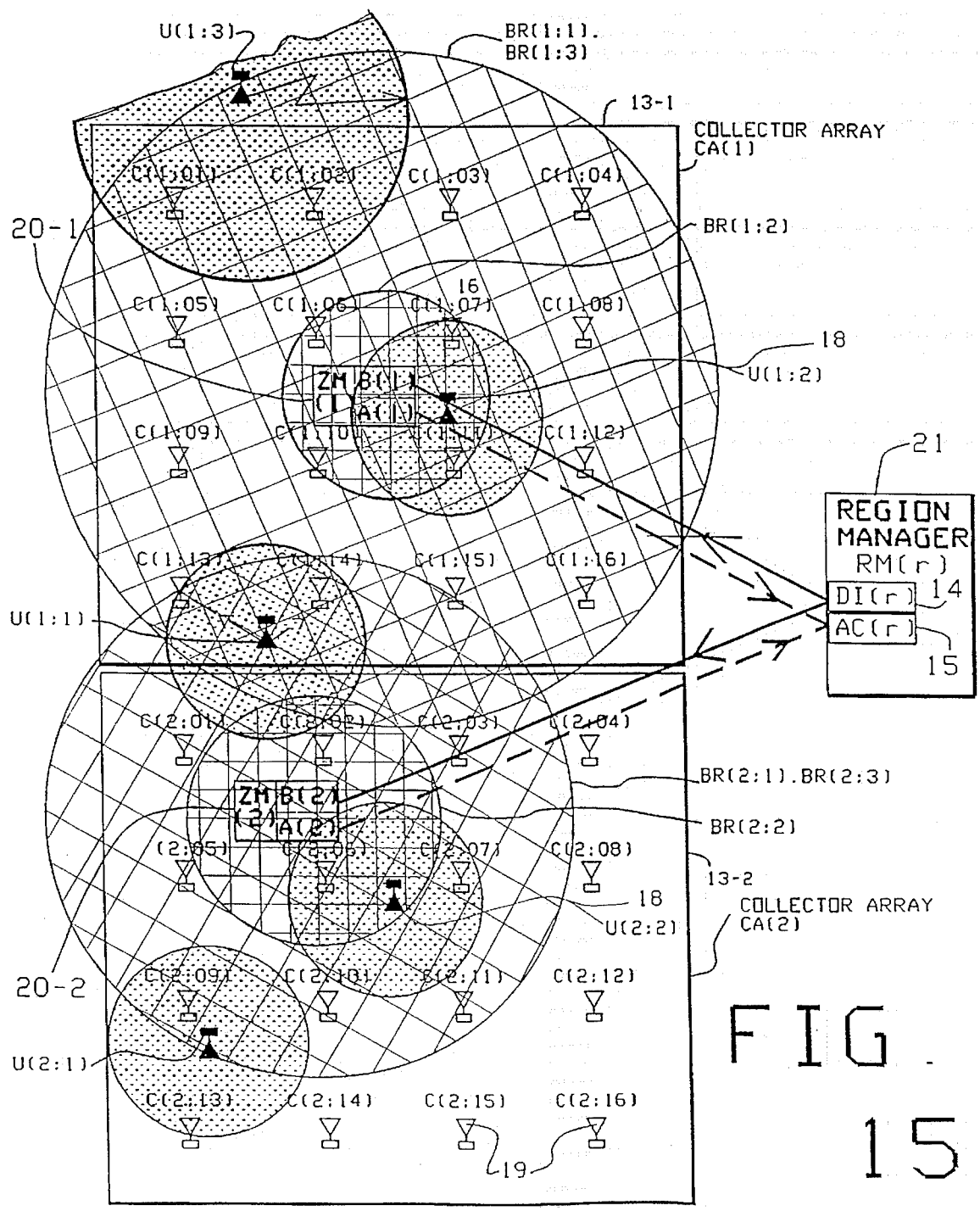
FIG. 15 depicts two zone managers (including broadcasters) of the FIGS. 2 and 3 type, each using two broadcast ranges for broadcasting forward channel communications to five users and two corresponding collector arrays, each having a plurality of collectors for receiving and retransmitting reverse channel communications from the five users to two aggregators in the two zone managers, respectively.

In FIG. 15, most of the full-duplex channels are identical to that of FIG. 14. The difference is in the means by which the collectors C1, C2, and C3 isolate the transmissions each makes to the aggregator from the received user transmissions from users U1, U2, and U3, and from the transmissions from other collectors. Here each collector shifts the individual carriers corresponding to each user to carriers that are unused by users or other collectors, creates a composite broadband signal spanning the allocated reverse channel spectrum, but with significant power only in those shifted carrier bands, and then sends this broadband composite signal to the aggregator A1.

The two figures, FIG. 14 and FIG. 15, show two means for isolating collector transmissions to the aggregator. Other means include using physical changes to the collector-to-aggregator broadcast, such as highly-directional antennas (29-C in FIG. 9) for forwarding means to the aggregator, or using horizontal polarization to isolate collector transmissions from user transmission. Isolation may also be accomplished by using spread spectrum techniques to re-transmit the user carriers received at each collector over the entire allocated reverse channel spectrum.

OPERATION

System Operations

The present invention creates a wireless operating system. One embodiment of that wireless operating system has been described in terms of the hardware and software that comprise the separate parts of the operating system. The broadcaster, collector array, and aggregator create a full-duplex communications channel used to communicate with a mobile user. The operation of this system is under the control of the zone managers, which manage individual broadcast zones, and the region managers, which manage the operation of arrays of broadcast zones. Embodiments of the wireless operating system controls are now described with respect to a number of different operations.

The inherent benefits of this wireless operating system allow for increased capacity, coverage, and quality over prior or conventional cellular systems. The collectors of a collector array receive user signals and retransmit them to an aggregator at a zone manager. The presence of the collector array allows users to transmit with lower power for a given size zone (since the collectors are closer to users than the base stations in conventional cellular systems), thus increasing coverage by allowing zones larger than conventional cells. The collectors provide signal strength measurements which are used by the zone manager to determine user location for accurate forward and reverse link power control and more efficient frequency reuse, thus improving capacity. The signals from the collectors are aggregated at the aggregator to provide greater communications link quality.

System operations will first be described at the zone level. One embodiment of the power management and location-finding functions will be detailed, and then the enhanced abilities of this embodiment will be demonstrated by contrasting its performance for several call-handling sequences to the methods used by conventional cellular systems.

Power Management Operations

There are two power levels to manage in cellular systems, namely, broadcaster-to-mobile user (forward channel) power, and user-to-collector (reverse channel) power. Power requirements are determined by the distances between the broadcaster and the mobile users, the propagation path losses over those distances, and the signal-to-noise and signal-to-interference ratios required for acceptable telephonic connection quality. For simplicity, a forward channel signal will be said to reach a mobile user if it does so with acceptable connection quality. For IS-54B and IS-136 digital cellular equipment, the power measurement capabilities of digital mobile phones are an additional, independent measure of the adequacy of forward channel power. A reverse channel signal will in general be received by several collectors. It will be said to reach the collector array if the signal-to-noise and signal-to-interference ratios at a sufficient number of collectors allow for an aggregation of those signals into a composite signal of sufficient quality. The precise values for the signal strength ratios required depends upon the cellular standard used. Under one embodiment of the present invention, if a signal is received by three or more collectors at ratios within 8 dB of the minimal ratios for acceptable quality, then the aggregation process will retain an acceptable signal quality. If the received signals are within 6 dB of the minimal ratios for acceptable quality, then in general only two collectors will be required.

Conventional cellular systems have at best weak location-finding capabilities. The round-trip time delay for the base station-to-mobile path is used in some implementations to estimate mobile user range. Given that the speed of radio waves in the atmosphere is approximately 300 meters per microsecond, time delay measurements as precise as a few microseconds still do not locate a mobile's range with much precision, and say nothing of the direction to a mobile user from a base station. Under the present invention, the plurality of collector returns of a given mobile's communications allows for both time delay measurements and signal strength measurements over a number of paths. The triangulation possible with this new information allows for greatly improved estimates of mobile location, both as to range and direction.

Under one embodiment of the present invention, collectors also measure the received signal strengths from broadcaster forward channel communications. Since the initial broadcast power levels for these channels are known exactly, the received signal strengths at the collectors will provide a highly-accurate, dynamically obtained propagation path loss map for a zone. This allows the wireless operating system to respond to both short-term and long-term variations in the propagation environment.

Single Zone Operation—FIG. 14

In FIG. 14, an example with U(1;1), U(1,2) and U(I;3) users within the range of a ZM(1) zone manager 20 is shown. Zone manager 20 through operation of B(1) broadcaster 16 transmits forward channel communications to mobile users at two different power levels. The first power level establishes the BR(1;1) and the BR(1;3) broadcast ranges (B-Ranges) with equal power levels which reach both the U(1;1) and the U(1;3) mobile users. Because U(1;2) is closer to B(1), a lower broadcast power level is used, creating the smaller B-Range BR(1;2). The B(1) broadcaster receives the forward channel signals from the DI(r) director 14 of the RM(r) region manager 21.

Each of the users in FIG. 14 broadcasts in a reverse channel. The U(1;1) user broadcasts in a UR(1) user range (U-Range) to reach the collectors C(1;13) and C(1;14) which are part of the collector array 13. Similarly, the U(1;2) user broadcasts in a UR(2) U-Range which reaches the collectors C(1;07) and C(1;11). The U(1;3) user broadcasts in a UR(3) U-Range with a broadcast power which reaches the collectors C(1;01) and C(1;02). Each of the collectors in the collector array 13 in FIG. 14 transmits to the ZM(1) zone manager 20 and is received by the A(1) aggregator 17. The aggregator 17, in turn, retransmits the reverse-channel communications from each of the users and collectors to the AC(r) accumulator 15 within the RM(r) region manager 21.

Call-Handling Control Sequences

Cellular telephone systems use prescribed sequences of control messages between a mobile receiver and the system control center to handle each change in the status of a mobile receiver. The IS-136 standard describes control sequences to be carried out prior to, during, and at the conclusion of calls to and from the mobile user. The increased information available to the system from the multiplicity of collectors allows augmentation of the standard control sequences. For purposes of comparison, we briefly describe the calling sequences for several events under prior methods and indicate the new control functions available under the invention. Note that these augmentations do not conflict with current handset specifications. The specific control sequences discussed are mobile receiver registration at powerup, mobile terminated call setup, mobile originated call setup, and a new control sequence for handling a 911 call.

For clarity, the calling sequences will first be described in terms of current cellular implementations. Thus the system control resides at the mobile telephone switching office (MTSO), which communicates to a user (U) by commanding broadcasts and receiving returns at a particular base station office (BSO), which is also referred to as a cell. The new implementation can then be described by actions of the region manager (RM), the zone manager (ZM), and the mobile user (U). The specific link from U to ZM, via broadcaster on the forward path and collectors-aggregator on the return path, will not be mentioned unless necessary.

Mobile registration at powerup

Each cell in a cellular telephone system broadcasts over one of a set of 21 call setup channels. The forward link in the control channel is called a paging channel, while the return link from U is called an access channel. The paging and access channels are time division multiplexed digital channels which carry traffic at 10 kbps. When a U is switched on, it scans the 21 assigned paging channels, selects the strongest, and signals its presence via the corresponding access channel. The BSO receiving the signal returns a request for user registration and physical data on user type, and signals U to use a particular slot in the access channel. In addition, U power control may be commanded at this time. The requested data is used by the MTSO to validate the user and to place it in either the Home Location Register or the Visitor Location Register. Under this existing scheme, the cellular system does not attempt to accurately locate a mobile after registration but prior to the origination of a call to or from that mobile.

The new implementation will follow the same steps as the old, but will use the collector RSSI (received signal strength indicator) data from the specified slot on the access channel to perform localization on U. This data will be used by both the ZM and the RM as input to resource allocation algorithms, since the presence of a U in standby mode implies a possible use of system resources to support a call to that U. The ZM periodically pages U to request access channel transmissions that are used to re-locate U and fine-tune the mobile power control. The location information is saved by the ZM and also passed to the RM where it forms the history database that is used for optimizing dynamic channel allocation and handoff algorithms. If the localization procedure indicates that U has reached the boundary of another zone, the old ZM signals U to initiate a new registration process with the new ZM over the control channel pair assigned to that new ZM. This is in effect an extremely simple handoff. If a user U does not respond to a request from the ZM, it is assumed to have either exited the region or have been powered down, and the RM is signaled to remove it from the registers of active users in the region.

Mobile-terminated call

The current standard for a landline-originated (mobile-terminated) call begins when the request for a connection reaches the MTSO. The MTSO instructs all cells to page U over their assigned paging channel. U recognizes its page and responds to the BSO over the paired access channel. The BSO informs the MTSO that it is in communication with U. The MTSO then selects an idle voice channel for the call, sets up the switching between that channel and the landline trunk, and informs the BSO of the channel designation. The BSO informs U of the voice channel assignment over the paging channel, and begins broadcasting a particular supervisory audio tone (SAT) over the forward link of that voice channel. This SAT is one of three tones near 6 kHz, and each BSO uses only one SAT in its communications with all users U in its cell. When a particular U receives the SAT on the voice channel, it responds by repeating the SAT back over the return link of the voice channel. Once the SAT has been confirmed as received by the BSO, the paging and access channels are released. Further control communications between U and the BSO are carried over the voice channel, using blank-and-burn messaging, where the voice channel is blanked for 50 ms and a burst of control traffic at 10 kbps is sent. Both U and the BSO use the presence of the SAT as confirmation that a communications link exists. If the SAT is dropped for more than 5 seconds, each assumes that the call has been terminated by the other. When voice channel communications with U are established, the BSO places the associated landline trunk in an off-hook state, which tells the MTSO that a successful voice channel is in place. The MTSO then commands the BSO to signal U of an incoming call. U alerts the user, and sends an on-hook signal by adding a signaling tone (ST) at 10 kHz to its return voice channel transmission. The BSO receives the ST, and informs the MTSO to send a ringback signal over the landline. When and if the call is answered at U, it drops the ST, the BSO tells the MTSO to drop the ringback signal to the landline, and voice communications are then conducted over the established path.

The new cellular implementation does not require that a user U be paged over the entire system. The registration process at startup, and successive localizations and possible re-registrations in new zones, has kept U localized. The scheduling algorithms at the RM and ZM have already identified the optimum voice channel and transmit and receive power levels to be assigned to U. This designation is signaled to U, and thereafter the standard implementation is followed. The algorithms used by the ZM and RM to assign optimum channels and power to a call can be briefly described: the ZM, through the localization process, has determined the required broadcast power necessary to reach U with sufficient signal-to-noise levels to allow a good connection. This level may need to be increased due to the data on existing calls in the zone and neighboring zones. The ZM has been given limits on the broadcast strength it is permitted to use on each available channel. If no available channel has the required power limit, the ZM informs U and asks for permission to use an available channel at a new higher power than had previously been allowed. The RM optimizes the decision whether to allow this by considering the call loads in other zones U is likely to enter during a call and determining if a power balance allowing acceptable signal-to-interference ratios is possible. Permission to use the required power may be granted on that or another channel, or the call may be dropped. If a channel is available at the required power setting, the ZM assigns that channel to U and also signals the RM of the broadcast power it will use on that channel. As the call continues, the ZM monitors the call, localizing U to determine if a change to either broadcaster or user power is required. This may again require permissions from the RM. The scheduling algorithms at the RM will give higher priority to continuing established calls then to initiating new calls.

Mobile-originated call

For simplicity, consider only a mobile-to-landline connection. A mobile-to-mobile connection would simply combine mobile-originating and mobile-terminating control sequences in a predictable manner. Under the current standard, U signals its request for a connection to the BSO over the access channel. The request is relayed to the MTSO, which selects an idle voice channel and informs the BSO. Thereafter, the control sequence follows the standard for a user-terminated call, with the exception that the landline connection is not attempted until after a successful connection has been established between U and the BSO over the voice channel. The new implementation would allow the ZM to initiate voice channel activation on the predetermined channel at the pre-determined power. When the voice channel was established, the RM would be informed, and the RM would immediately extend the connection to the PSTN.

911-call handling procedure

The diversity of collectors in the invention will allow for better localization of mobile users. This has far-ranging implications for the overall system architecture, allowing much more efficient resource allocation algorithms. The more collectors in a zone (or zones) that hear a particular U, the better the localization. A ZM will balance the need for localization with the requirement of low mobile user power for improved signal-to-interference performance on the return link and to extend mobile battery life. This requirement will be dropped, however, in the case of a (user-originated) 911 call. Note that U must be powered up before the 911 call can be attempted, so we will assume that the mobile registration at powerup sequence described above has been attempted. The system would also respond to 911 calls from a U that could not be registered, for whatever reason. In either case, receipt via the access channel of a 911 request from a particular U would trigger the 911 sequence now described. For simplicity's sake, consider for now the case of a single 911 call. Colliding 911 requests would be assigned priorities and handled as in current PSTN 911 implementations.

The system has dedicated 911 response voice channels that will always be available at maximum power. When a 911 request is initiated by a particular U, the serving ZM notifies the RM. The 911 request will be at the maximum possible power for H. All collectors in the zone and surrounding zones will be instructed to provide localization data to the RM, which will execute a region-wide localization algorithm of greater complexity and accuracy than the standard localization algorithms used by the ZM. Simultaneously, the serving ZM will initiate the voice channel establishment procedure described above for a mobile-originating call, and the RM will establish a landline connection to the 911-handling function of the PSTN. The RM will frequently re-localize the 911 call.

Should a handoff become necessary in the course of a 911 call, it will be handled with the highest priority. A new voice channel will always be available, and the handoff point will be optimally chosen using the finer localization and greater power level the 911 call is afforded.

Two Zone Operation—FIG. 15

In FIG. 15, the RM(r) region manager 21 and the ZM(1) and ZM(2) zone managers 20-1 and 20-2 are shown together with CA(1) and CA(2) collector arrays 13-1 and 13-2. In FIG. 15, five users U(2;1), U(2;2), U(1;1), U(1;2) and U(1;3) are shown. In FIG. 15, the ZM(1) zone manager 20-1 and the CA(1) collector array 13-1 are the same as in the FIG. 14 example. In FIG. 15 the CA(2) collector array 13-2 has been added together with the ZM(2) zone manager 20-2 and the users U(2;1) and U(2;2). Note that the B(2) broadcaster in the ZM(2) zone manager 20-1 has two broadcast power levels, one level for the BR(2;1) and BR(2;3) B-Range and one level for the BR(2;2) B-Range as in FIG. 14.

Figure 16:
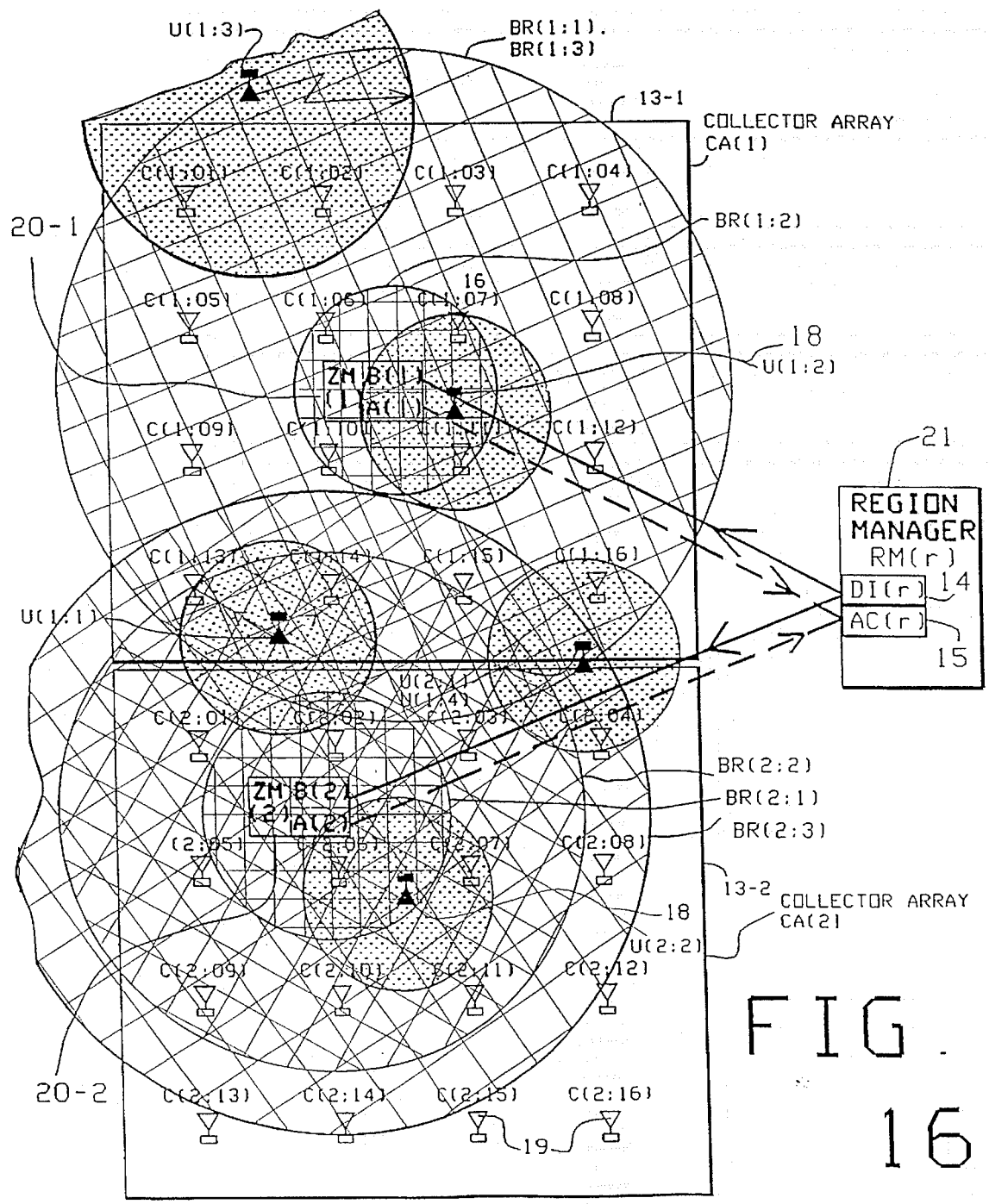
FIG. 16 depicts the FIG. 15 configuration with one of the users moved to a new location.

User Movement Operation—FIG. 16

In FIG. 16, the same general elements of FIG. 15 are shown with the U(2;1) user moved from the lower left-hand corner to the upper right-hand corner of the CA(2) array 13-2. Also the broadcaster of the ZM(2) zone manager 20-2 has three different broadcast powers to establish three different broadcast ranges BR(2;1), BR(2;2) and BR(2;3).

FIGS. 15 and 16 demonstrate the mobile designated U(2;1) moving from the lower left in FIG. 15 to the upper right in FIG. 15 of the CA(2) collector array 13-2. Specifically, the path taken by U(2;1) is on a straight line from the area of C(2;13) to the area of C(1;16). The following sequence of events describes the relevant system control activities: Under the control of ZM(2) zone manager 20-2:

a) the U(2;1) user is initially received on C(2;9) and C(2;13).

b) the U(2;1) user is then received on C(2;6), C(2;9), and C(2;10), and broadcaster B(2) power level on the U(2;1) assigned forward communications channel is reduced to create a smaller BR(2;1) B-Range, because U(2;1) is now closer to the B(2) broadcaster.

c) the U(2;1) user is then received on C(2;3), C(2;6), and C(2;7), and the broadcast power is increased to increase BR(2;1) since U(2;1) is now moving away from B(2).

d) as the U(2;1) user begins to be received only by C(2;3) and C(2;4), broadcast power is again increased to increase BR(2;1). ZM(2) zone manager 20-2 determines that the mobile is moving out of the coverage range of collector array CA(2). ZM(2) zone manager 20-2 sends a message to region manager RM(r) 21, informing RM(r) 21 of the imminent need for a handoff and reporting the location of U(2; 1).

e) ZM(2) zone manager 20-2 receives a message from RM(r) 21, indicating that ZM(1) zone manager 20-1 is prepared to accept handoff of U(2;1). RM(r) 21 informs ZM(2) zone manager 20-2 of the new frequency pair (broad-cast/receive channel pair) allocated by ZM(1) zone manager 20-1 for the connection to U(2;1). Upon changing to this new frequency pair U(2;1) passes under the control of ZM(1) zone manager 20-1 and will receive the new designation U(1;4).

f) ZM(2) zone manager 20-2 sends a handoff message to U(2;1), indicating the new frequency pair that it should use under its new designation as U(1;4) for communications within the purview of zone manager ZM(1) zone manager 20-1. Upon receiving acknowledgement from U(2;1), ZM(2) zone manager 20-2 turns off the ZM(2) zone manager 20-2 broadcast and tells C(2;3) and C(2;4) to stop listening to the U(2;1) reverse channel. ZM(2) zone manager 20-2 also de-allocates the broadcast channel that was used for U(2;1) so that it can be reused by a new user under the control of ZM(2) zone manager 20-2.

Under control of RM(r) region manager 21:

a) RM(r) region manager 21 receives a message from ZM(2) zone manager 20-2 indicating that U(2;1) is in need of handoff. RM(r) 21 determines that U(2;1) is moving towards zone 1.

b) RM(r) region manager 21 sends a message to zone manager ZM(1) zone manager 20-1 instructing ZM(1) zone manager 20-1 to listen for U(2;1) on its assigned zone 2 return channel frequency.

c) RM(r) region manager 21 receives a message from ZM(1) zone manager 20-1 indicating that U(2;1) has been heard and localized by collectors in the collector array CA(1), and that a new frequency assignment has been prepared for U(2;1), which will be designated U(1;4).

d) RM(r) region manager 21 sends a message to ZM(1) zone manager 20-1 giving muting data for the forward channel communications to U(1;4) from distributor DI(r) 14 and reverse channel communications from U(1;4) to accumulator AC(r) 15.

e) RM(r) region manager 21 sends a message to ZM(2) zone manager 20-2, indicating that a handoff has been prepared and that ZM(2) zone manager 20-2 should instruct U(2;1) to tune to its newly assigned frequency.

Under control of ZM(1) zone manager 20-1:

a) ZM(1) zone manager 20-1 receives a request from RM(r) 21 to locate U(2;1) on a given channel being used by U(2;1). ZM(1) zone manager 20-1 requests all CA(1) collectors C(1;01) through C(1;16) to monitor this given channel and to report back the received signal strength.

b) Upon receiving signal strength measurements from the CA(1) collectors, ZM(1) zone manager 20-1 determines that collectors C(1;15) and C(1;16) can best receive the approaching U(2;1) user.

c) ZM(1) zone manager 20-1 allocates a broadcast frequency for the U(2;1) user and designates it U(1;4).

d) ZM(1) zone manager 20-1 sends a message to RM(r) 21 indicating that U(2;1) has been captured and a new frequency pair has been allocated to it.

e) ZM(1) zone manager 20-1 receives routing data for forward channel communications to U(1;4) from distributor DI(r) 14 and for reverse channel communications to accumulator AC(r) 15 and begins transmitting forward channel communications on the newly assigned frequency.

f) ZM(1) zone manager 20-1 begins receiving reverse channel communications from U(1;4) from collectors C(1;15) and C(1;16) via aggregator A(1). ZM(1) zone manager 20-1 routes reverse channel communications to AC(r) 15. Handoff is complete.

Dynamic Channel Assignment Operation

Conventional cellular systems utilize fixed channel allocation. For example, a fully built out AMPS cellular system using a (7,3) channel partitioning scheme allocates a fixed number of channels (18 or 19) to each sector of each cell within the system. Not only is the number of channels allocated to a sector fixed, but the exact frequencies allocated to that sector are fixed. A fixed allocation of resources makes it difficult for a cellular system to respond to changes in the traffic load on a moment-to-moment or even month-to-month basis. The academic literature contains many examples of dynamic channel allocation algorithms that greatly increase system capacity by increasing the efficiency with which the system's resources are allocated to the locations where the resources are most needed at any particular time. See, for example, "Channel Borrowing Without Locking for Sectorized Cellular Communications", by H. Jiang and S. S. Rappaport, IEEE Trans., VT-43, No. 4, 1994, pp. 1067–1077.

There are several reasons why fixed channel allocation has been used in conventional cellular systems. First, analog radio equipment for combining several channels requires different hardware for different frequencies. A frequency change thus implies a hardware replacement, making the operation uneconomical. A second reason why dynamic channel allocation has not been introduced in conventional systems is that most of the proposed allocation schemes require both broadcaster and mobile power control on a channel basis, and analog channel combiners cannot in general do this.

Digital RF equipment can mitigate the above problems, but digital implementations of conventional cellular systems cannot make good use of dynamic allocation algorithms. This is because such algorithms depend to greater or lesser extent on knowledge of the mobile user location within a cell, and accurate location information is not available in conventional cellular systems. Also, conventional cellular systems concentrate network control functions in the MTSO, and the greatly increased data requirements for the implementation of dynamic allocation algorithms can overwhelm the capacity of standard control channels and the processing capacity of the MTSO.

Embodiments of the present invention for channelized wireless communications will make full use of dynamic channel allocation or more generally, dynamic resource allocation, by solving both of the problems just described. Localization within a zone is provided by the operation of the aggregator using measurements provided by the array of collectors. This allows for the most intelligent of algorithms to be applied. The distributed processing power of region managers and zone managers allows for local decision making using data at its source within a zone, performed by control algorithms at the zone managers. Global resource monitoring and arbitration over the network of zones is then implemented by control algorithms at the region managers.

TABLES 2 through 5 contain one embodiment of algorithms that implement dynamic channel allocation with both broadcaster and mobile power control over the distributed control hierarchy of the present invention. The particular dynamic channel allocation algorithm used by a region manager will depend on the nature of the system: AMPS channels will be handled differently from time slots in a TDMA system. For clarity, the following description will consider zone broadcasters and collectors with omnidirectional rather than sectorized antennas. In addition, the software functions governing control data flow between the various system components, and the switching functions connecting the distributor/broadcaster and aggregator/accumulator structures with outside networks, will be implicit. In the data structures below, Nzone refers to the number of zone managers controlled by a region manager and Nfreq refers to the total number of channel pairs available. The relevant data structures are:

At a region manager:

RegionFreqMap(Nzone,Nfreq)—Frequency mapping for all zones and for all frequencies, in the form of maximum allowed broadcaster power for each frequency (frequency pair) in each zone. Initialized by allocating the maximum possible power for a reserved set of frequencies in each zone, using some large frequency reuse partition.

RegionFreqUse(Nzone,Nfreq,2)—Current status of the region as reported by the individual zone manager. For all zones and for all frequencies, the current commanded broadcaster and user power levels. Updated by reports from individual zone manager.

At a zone manager:

PowerPermit(Nfreq)—Maximum allowed broadcaster power to be used for each individual frequency. Updated by region manager.

HomeFreq(*)—Frequencies reserved for non-power-limited use in the zone.

BorrowedFreq(*)—Frequencies other than home frequencies that are currently in use for connections in the zone.

PowerUse(Nfreq,2)—Current commanded broadcaster and user power levels in the zone.

MobileID(*)—ID's of active users located in the zone, updated by aggregator.

MobileLocation(*,2)—Location of each active user in the zone, updated by aggregator.

MobileConnect(*)—Frequency assignment flag, set to assigned frequency if user is connected and communication is in progress, zero if user is active but not connected.

TABLE 2

© COPYRIGHT 1995 SPECTRUM WIRELESS, INC.

MATLAB implementation of the Region Manager function to initialize frequency power mapping.
function InitializeFreqMap( )
%
%    This function is run to initialize the frequency map for a region.
%    In this implementation, the underlying frequency reuse partition
%    is a 12-zone partition. Thus each wne has been assigned a
%    designation between 1 and 12. For the frequencies assigned to a
%    zone (home frequencies), the zone manager is allowed to use maximum power.
%    For frequencies not in the assigned set, the allowed power level

TABLE 2-continued

© COPYRIGHT 1995 SPECTRUM WIRELESS, INC.

```
%       is initialized at Squelch (in dB) less than the maximum allowed
%       power. Power levels are specified in dBm.
%
for iz = 1:Nzone
        RegionFreqMap(iz,:) = MaxForward - Squelch;
        RegionFreqMap(iz,FreqSet(ZoneDesig(iz))) = MaxForward;
end
```

TABLE 3

© COPYRIGHT 1995 SPECTRUM WIRELESS, INC.

MATLAB implementation of the region manager function to monitor frequency use and reset allowed power levels. Run continuously.

```
function FreqMonitor( )
%
%       This function will run continuously at the region manager. It will be cycled
%       through the list of frequencies to reset allowed power levels as
%       appropriate.
%
%       Get zones that have borrowed the frequency. if such zones exist,
%       reduce power available for other potential borrowers.
Borrowed = length(find( RegionFreqUse(:,Freq) > 0 & ...
                        RegionFreqMap(:,Freq) ~ = MaxPower ));
%
%       Scale to reflect size of partitioning (12 in this example) and
%       multiple use penalty.
%
Npart = 12;
Borrowed = Borrowed*Penalty*Nzone/Npart;
if ( Borrowed > 0)
        for iz = 1:Nzone
                if ( RegionFreqMap(:,Freq) ~ = MaxPower )
                        RegionFreqMap(:,Freq) = MaxPower - Squelch -
Borrowed;
                end;
        end;
end
```

TABLE 4

© COPYRIGHT 1995 SPECTRUM WIRELESS, INC.

MAThAB implementation of the zone manager function to handle a connection request. Event driven.

```
function GetFreq( Mobile, AssignedFreq, AssignedForward, ...
                  AssignedReverse)
%
%       This function will determine whether or not a frequency is
%       available to handle a connection request, and will assign power
%       levels for the connection if possible.
%
%       if no assignment is possible, AssignFreq is set to -999.
%
%       User location is used to determine propagation path loss and
%       local noise floor.
%
PathLoss = GetPathLoss( MobileLocationMobile) );
LocalFloorFor = GetNoiseFloorFor( MobileLocationMobile) );
LocalFloorRev = GetNoiseFloorRev( MobileLocationMobile) );
%
%       Given a specified margin to cover required signal-to-noise
%       signal-to-interference, as well as a safety margin, get required
%       power at each frequency in the forward direction. In reverse,
%       set to collector-deployment value over reverse noise floor.
%
MinPowerReqdFor = LocalFloor + PathLoss + Margin;
MinPowerReqdRev = LocalFloor + PathLoss + Margin - GainFromColl;
%
%       Try home frequencies first. If a useable home frequency
%       exists, take it.
%
```

TABLE 4-continued

© COPYRIGHT 1995 SPECTRUM WIRELESS, INC.

```
Homer = find( PowerPermit(HomeFreq) > MinPowerReqdFor(HomeFreq) )
if ( length(Homer) > 0 )
        AssignFreq = HomeFreq(Homer(1));
        AssignForward = MinPowerReqdFor(HomeFreq(Homer(1)));
        AssignReverse = MinPowerReqdRev(HomeFreq(Homer(1)));
        return;
end;
%
%       Now look for a frequency to borrow
Possible = find( PowerPermit > MinPowerReqdFor );
%       If any useable frequency exists, take it. Else, fail.
%
if ( length(Possible) > 0 )
        AssignFreq = Possible(1);
        AssignForward = MinPowerReqdFor(Possible(1));
        AssignReverse = MinPowerReqdRev(Possible(1));
else
        AssignFreq = -999.;
end;
%
```

TABLE 5

© COPYRIGHT 1995 SPECTRUM WIRELESS, INC.

```
MATLAB implementation of the zone manager function to monitor active connections
and force soft handoff from a home frequency to a borrowed frequency when that is
possible. Run continuously once home frequencies have been filled.
function HomeMonitor( )
%       This function wiu determine whether any user connection
%       currently served by a home frequency can be adequately served
%       by a borrowed frequency. If so, a handoff is commanded for the
%       connection in question to a new borrowed frequency.
%
%       Get user connections served by home frequencies
%
for ii = 1:Nconn
        if ( any(HomeFreq = = MobileConnect(ii) )
                Homer = MobileConnect(ii);
%
%       User location is used to determine propagation path loss and
%       local noise floor.
%
                PathLoss = GetPathLoss( MobileLocation(ii,:) );
                LocalFloorFor = GetNoiseFloorFor(
MobileLocation(ii,:) );
                LocalFloorRev = GetNoiseFloorRev(
MobileLocation(ii,:) );
%
%       Given a specified margin to cover required signal-to-noise
%       signal-to-interference, as well as a safety margin, get required
%       power at each frequency in the forward direction. In reverse,
%       set to collector-deployment value over reverse noise floor.
%
                MinPowerReqdFor = LocalFloor + PathLoss + Margin;
                MinPowerReqdRev = LocalFloor + PathLoss + ...
                                Margin - GainFromColl;
%
%       Now look for a frequency to borrow
%
                Possible = find( PowerPermit > MinPowerReqdFor );
%
%       If any useable frequency exists, take it. Do swap handoff.
%
                if ( length(Possible) > 0 )
                        SwapHandoff( ii, Homer, Possible(1),...
MinPowerReqFor(Possible(1)),...
MinPowerReqRev(Possible(1)) );
                end;
        end;
end
%
```

Figure 17:
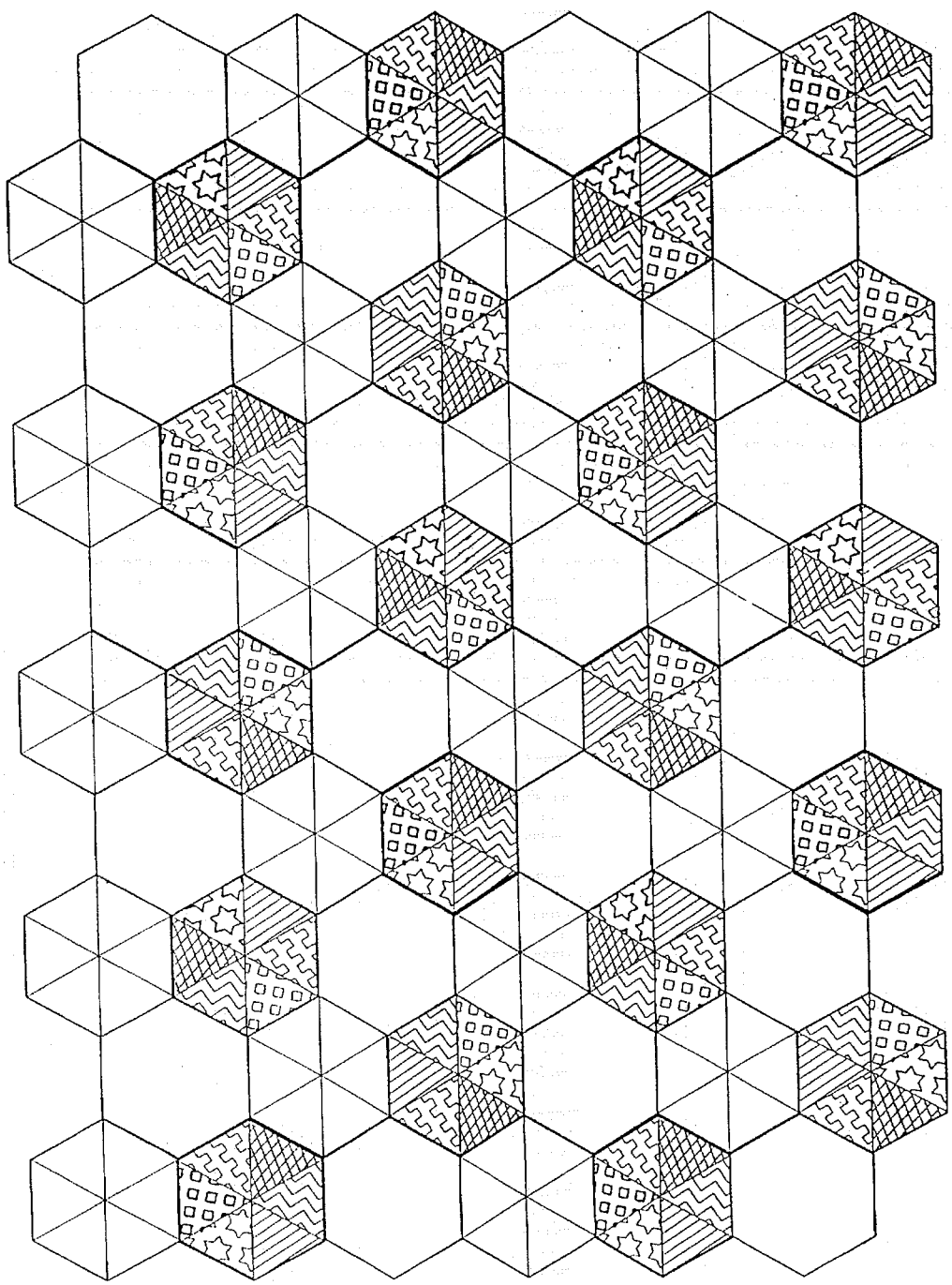
FIG. 17 depicts a hexagonal grid, with 60° broadcast sectoring and with (3,6) channel partitioning.
Figure 17:
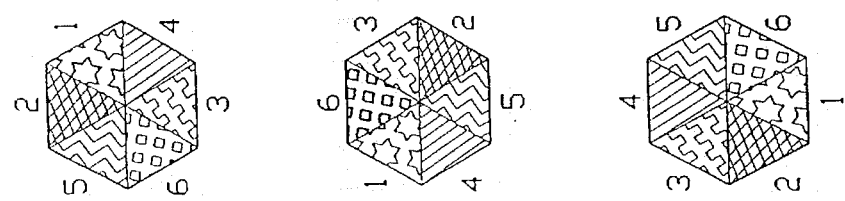

Collator Arrays For Improved Capacity And Quality—FIG. 17

In accord with the present invention, a plurality of collectors are used in a broadcaster zone to provide a wireless operating system architecture that has greater communication capacity and better communications quality than prior wireless systems. This result is demonstrated by the simple system example described below. This example does not, for clarity, include the use of either power control or dynamic channel allocation.

In a typical conventional mobile cellular system, a fixed number of radio communications carriers, each of a fixed spectral bandwidth and location, provide service over a specified service area. To simplify the example, the capacity gains that may be attained by a number of methods, for example, by multiplexing communications channels over a single carrier, are not considered. However, such methods for capacity improvement can also be employed in embodiments of the present invention. For the purposes of this example each radio carrier band is assumed to carry a single, half-duplex communications channel. A two-way communications channel requires two of these one-way channels, one used to broadcast to the mobile user and the other to receive from it. In conventional systems the transmit and receive channels are paired according to a fixed numbering scheme, and the combined pair is referred to as a channel, implying a two-way channel. That conventional nomenclature is adopted for this example. In conventional systems, the reverse channel is serviced by a single receiver co-sited with the forward channel broadcaster, whereas in the present invention the reverse channel is serviced by a plurality of collectors feeding an aggregator. There are 416 channels (channel pairs) per each current US licensed cellular system, with 21 used for control channels and 395 available for calls.

To provide the greatest possible capacity, a cellular system reuses the available channels from cell to cell. Interference between signals on the same channel (cochannel interference) is the limiting factor to this approach. Capacity and quality demands are balanced by defining a minimum standard for communications quality. A cellular system design attempts to maximize frequency reuse for greater capacity while ensuring that the cochannel interference remains low enough to provide the minimum level for acceptable quality. The AMPS design criteria is a ratio of 18 dB between the intended signal and the interference. The measure of quality is then the percentage of calls that fail to meet this standard.

System capacity is not determined by simply summing the number of available channels in each cell over all cells. Queuing theory must be used to determine the response of the system to randomly-arriving requests for connections. At certain times, all channels may not be in use, and at others, all channels will be in use and newly-arriving requests will be blocked. The offered load of a system is measured in Erlangs. System capacity is then defined to be the offered load for a given probability of blocked calls. The standard cellular system design criterion for blocked calls is a 2% rate. Given the number of channels available in a cell, the capacity of the cell in Erlangs is then computed from a standard formula.

A conventional cellular architecture uses one broadcaster/receiver base station per cell. Cell coverage is assumed by way of approximation to be hexagonal in shape, and the hexagonal tiling of many cells covers some service area (region). For purposes of comparison, in a capacity limited situation conventional cells are assumed to be the same size as broadcaster zones of the present invention. In a conventional cell, a transmitter/receiver pair are co-sited in a cell. In the present invention, a broadcaster is located at the same site of the transmitter/receiver pair of the cell, but an array of collectors is spread over the broadcaster range. One technique for increasing connection quality in cellular systems is to divide cells (or broadcaster zones in the present invention) into directional broadcast sectors by using broadcast antennas with 60° or 120° apertures for example.

In a specific example, a standard configuration for a conventional system has channels divided into seven groups that are repeated over groups of seven cells. To improve quality, 120° sectoring is used to reduce the number of interferors from the standard 6 in the unsectored case to 2. The capacity calculation for this standard configuration, denoted (K=7,S=3) for 7 cells, 3-sector reuse with 19 channels/sector gives 12.3 Erlangs/sector, 36.9 Erlangs/cell. System modeling is performed considering the outcome of a large number of trials to determine the cochannel interference. Assuming a radio propagation path loss coefficient of 3.0 and log-normal path shadowing with zero mean and 4 dB variance, approximately 27% of attempted calls in a cell will fail the 18 dB signal quality standard when the system is at full capacity.

Conventional AMPS cellular systems do not employ frequency partitioning schemes smaller than (7,3), although (4,6) partitioning schemes have been proposed. Cochannel interference in these cases reduces the service quality to levels at or below current standards. FIG. 17 describes a (3,6) frequency partitioning scheme which under the present invention provides better service quality while substantially increasing system capacity. For purposes of clarity, only the broadcast zones are shown, and the collector arrays are omitted from the figure. Also, for purposes of direct comparison to conventional cellular systems, the broadcast zones are indicated as hexagons. In FIG. 17, the partitioning scheme is shown in one zone set of the three zone set group. This pattern may be translated homeomorphically to the other two zone sets of the group. The other two sets are shown in FIG. 17. One of them is the set of zones marked by hexagons containing a sketch of the sector boundaries, and the other is the set of zones which do not have any internal marking. The (3,6) partitioning creates 18 separate frequency groups, which are distributed as indicated in FIG. 17.

Under this partitioning algorithm, the number of interferors rises to three, but the distances to those interferors are greatly increased, thus reducing the overall interference. For this (3,6) partitioning, the capacity calculation for 22 channels/sector gives 14.9 Erlangs/sector and 89.4 Erlangs/zone. This is a factor of 2.4 times the capacity of the (7,3) configuration for the conventional system. System modeling under the same assumptions listed above found that approximately 10% of attempted calls in the zone would fail to meet the quality standard at full capacity. This is a 2.7 times improvement over the result for the conventional system example.

In summary, the present invention provides, even considering only the simple comparison example, at least a doubling of both capacity and quality over existing conventional systems. Of course, when more complex implementations are employed the improvement is even greater.

Figure 18:
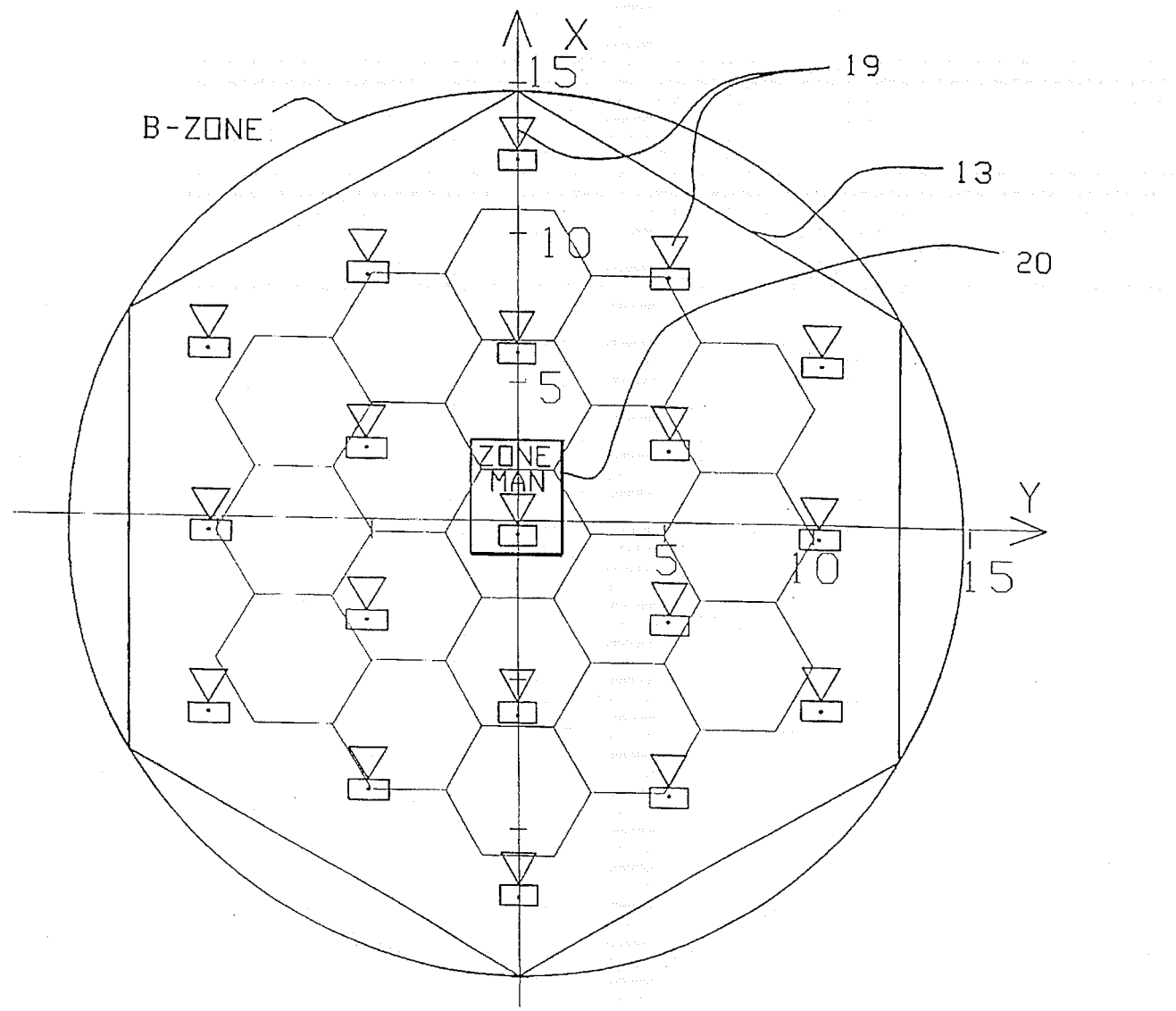
FIG. 18 depicts one embodiment of a broadcast zone and a collector array having collectors optimally located to maximize coverage of a selected area.

Collector arrays for improved coverage—FIG. 18

The previous example demonstrated one embodiment of the present invention with capacity and quality greatly superior to conventional cellular systems. The flexibility of the wireless operating system of the present invention also allows for embodiments designed to increase coverage. In the above capacity and quality improvement example, the reverse channel communications path from the user to the collector was made substantially shorter than the user to base station path in conventional cellular systems. The embodiment illustrated in FIG. 18 shows that reverse channel communications received by several collectors can be aggregated to provide higher communication channel quality over greater distances, thus increasing coverage area. The inner grouping of nineteen hexagons represents a set of conventional cellular system cells. The maximum size of a cell is determined by the base station antenna height and broadcast power, the user height and broadcast power, and by the ambient propagation environment. The reverse channel link is weakest for many reasons, including low power output, an omni-directional low gain antenna, and the difficulty of synchronizing the reverse channel communications of many users at one base station. MATLAB codes to determine coverage radii are presented in TABLE 6 and TABLE 7, which consist, respectively, of a propagation model corresponding to the parameterized model of Hata (Hata, M., "Empirical Formula for Propagation Loss in Land Mobile Radio Services," IEEE Trans., VT-29, No. 3, 1980, pp. 317–325) and a driver routine which determines coverage for given values of the antenna heights and locations, broadcast powers, and propagation environment.

For purpose of example, consider users broadcasting in the 850 MHz band with 200 mW at a height of 2 m to a base station antenna at a height of 33 m, in a suburban propagation environment. The relatively low base station height can be necessary due to zoning restrictions, for example. For this case, the maximum cell radius would be approximately 2.5 km. The set of nineteen conventional cells thus cover an area of 309 $km^2$. Now consider the array of collectors 19 of the present invention, as indicated in FIG. 18. Let the collector antenna heights also be 33 m. A base station broadcast power level of 100 W gives a coverage radius of 14.8 km. The MATLAB code presented in TABLE 7 demonstrates that the array of collectors 19 indicated in FIG. 18 will suffice to provide high quality coverage over that much larger radius. This is due to use of aggregation. Aggregation expands the effective radius of high quality coverage around a collector by utilizing the diversity of the reverse user to collector paths. The total area covered by the broadcast zone in this embodiment of the present invention is 571 $km^2$. The collector array of the present invention consists of relatively simple and low cost receivers and transmitters when compared to the base stations of conventional cellular system cells. Thus the deployment of nineteen lower-cost, more flexibly-sited collectors 19, as shown in FIG. 18, replaces nineteen expensive base stations while providing almost twice the coverage area.

Further coverage extensions are possible if the forward channel link is extended. This may be done, for example, by increasing the broadcaster (or base station) antenna height. If the broadcast antenna height is increased to 50 m and the user broadcast power level is increased to 600 mW, but the collectors are left at 33 m, then the conventional cell radius would be 4.2 km, providing coverage of 883 $km^2$, while the broadcast zone of the present invention is 19.4 km in radius, covering 977 $km^2$ with high quality communications links. While the ratio of area covered under this embodiment of the present invention is only 15% greater than that of conventional cellular systems, the economic advantage remains, since the collector antenna heights have remained at 33 m, and the base station antennas of the conventional system must be raised to 50 m. Zoning restrictions may add the additional costs of obtaining waivers, fulfilling special siting requirements, and time delays in deployment. Also, lower power transmitters are perceived to be more acceptable than higher power transmitters.

In open rural environments, where base station antenna height restrictions may be considerably relaxed, the present invention may be used to create broadcast zones limited only by the absolute limit for radio propagation at a given frequency. In the 850 MHz band, this limit is the radio line-of-site (RLOS) distance due to the curvature of the Earth and the refractivity of the air. For user antennas 2 m in height and broadcaster antennas 200 m in height, the RLOS distance is approximately 64 km. The area covered by this broadcaster range is 10740 $km^2$, and the collector array of FIG. 18 provides high quality connections over that area with collector antenna heights of only 50 m and for a user broadcast power level of only 600 mW. For early deployment of cellular systems designed to cover large areas, this embodiment of the present invention provides an enormous advantage over conventional cellular systems.

Figure 19:
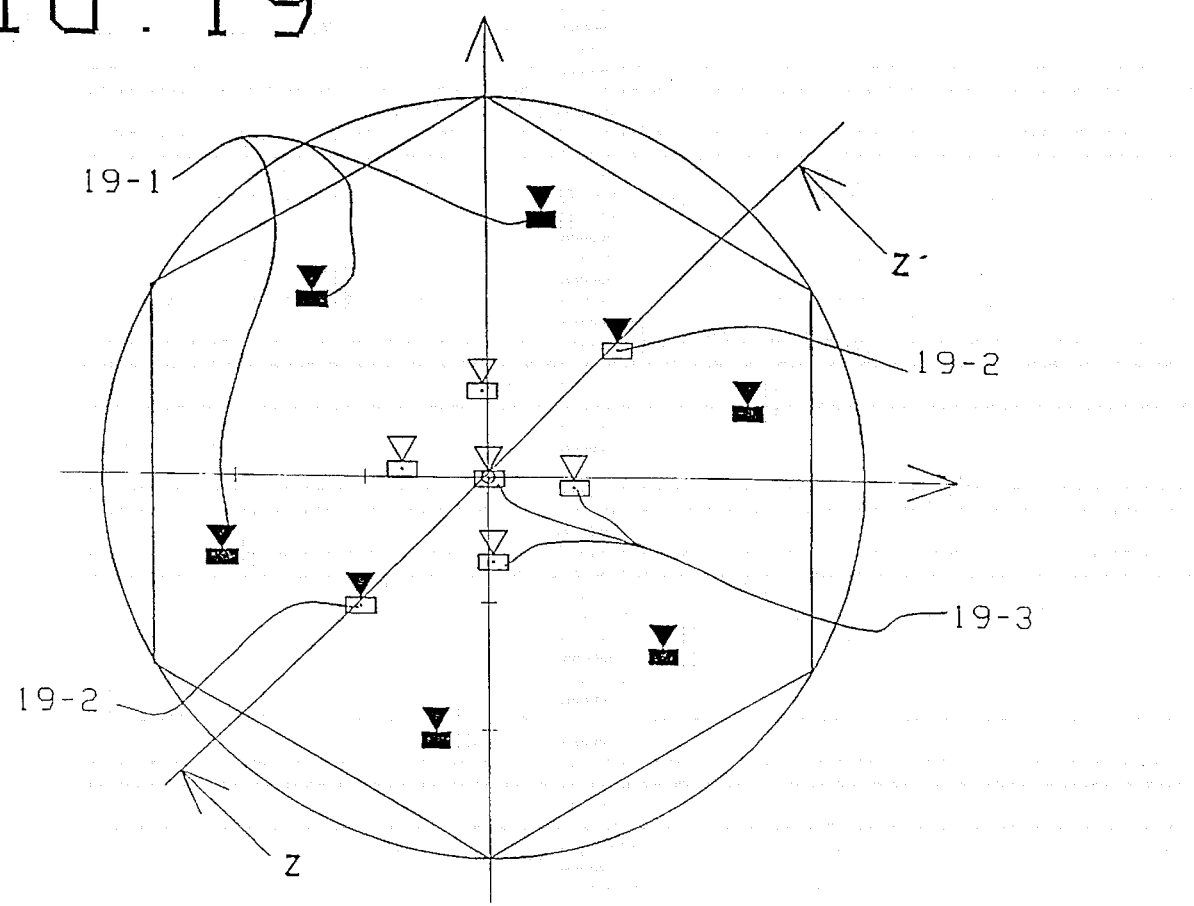
FIG. 19 depicts one embodiment of a broadcast zone and a collector array having collectors located with a variable concentration to match variable concentrations of users in selected areas.
Figure 20:
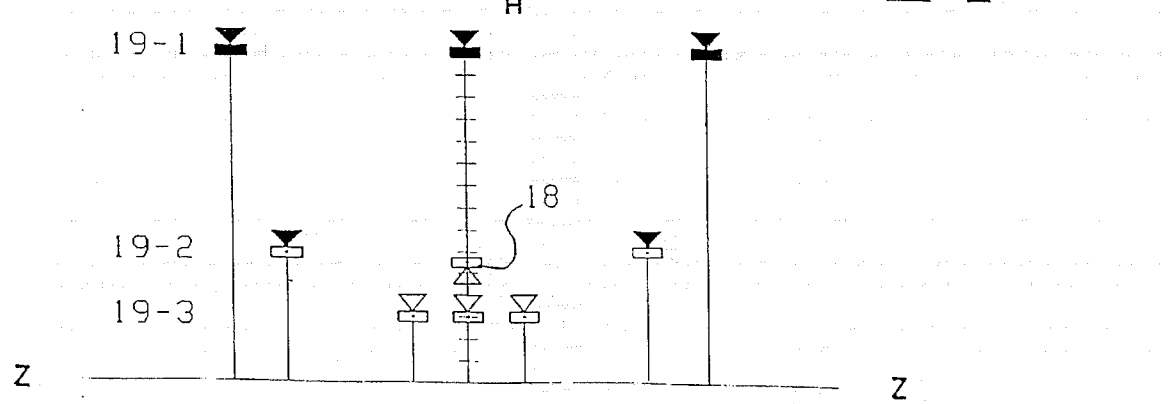
FIG. 20 depicts the broadcaster transmitter and collector receivers of FIG. 19 with collector receivers having variable heights.

Non-uniform collector arrays—FIGS. 19 and 20

The embodiment of the present invention shown in FIG. 18 employs a regularly-spaced array of collectors 19, and all of those collectors 19 have the same antenna height. The flexibility of the present invention is now illustrated in FIGS. 19 and 20. Here the collectors are non-uniformly spaced, as shown in FIG. 19, and have varying heights, as shown in FIG. 20. For example, collectors 19-1 are at 150 mz, collectors 19-2 are at 50 m, and collectors 19-3 are at 30 m. The broadcaster 18 is at 50 m. Terrain features that make radio propagation difficult in certain areas would require more closely spaced collectors, for example. In the illustrated example, the central region is, for example, a suburban development with strict height limits. Simulations using the tools presented in TABLE 6 and TABLE 7 confirm that for a base station power level of 100 W and a mobile power level of 600 mW, aggregation of the returned user reverse channel communications provides high quality communications links throughout the broadcast zone. This flexibility is an important feature of the present invention, because collector array spacing may vary for any of a number of practical reasons, including coverage, quality, reliability, capacity, zoning restrictions, and site availability.

TABLE 6

© COPYRIGHT 1995 SPECTRUM WIRELESS, INC.

```
function loss = hata(dist,hbase,hmob,freq,city)
%
%      loss = hata(dist,hbase,hmob,freq,city)
%
%      hata implements the Hata formulation of the Okumura model for
%      propagation path loss. The model assumes quasi-smooth terain
%      and is intended for the following range of input parameters:
```

TABLE 6-continued

© COPYRIGHT 1995 SPECTRUM WIRELESS, INC.

```
%
%     dist        base-mobile separation (km)    1 to 20
%     hbase       base station antenna (m)       30 to 200
%     hmob        mobile antenna (m)             1 to 10
%     freq        transmit frequency (MHz)       150 to 1500
%     city        City classification:
%                        'L' or 'l' large city
%                        'M' or 'm' small-medium city
%                        'S' or 's' suburban
%                        'O' or 'o' open area
%     The returned variable is the path loss in dB
%     Set up path loss terms that do not depend on citytype
loss = 69.55 + 26.16*log10(freq) - 13.82*log10(hbase) + ...
            (44.9 - 6.55*log10(hbase) )*log10(dist);
%
%     Now do corrections for city classification
%
%     Standard mobile antenna adjustment is for small-medium city
%
mobgain = (1.1*log10(freq) - 0.7)*hmob - 1.56*log10(freq) + 0.8;
citytype = upper(city);
if ( citytype == 'L' )
        if ( freq <= 200)
                mobgain = 8.29*(log10(1.54*hmob))*2 - 1.1;
        elseif ( freq >= 400)
                mobgain = 3.2*(log10(11.75*hmob))*2 - 4.97;
        end;
%     Here are out-of-city adjustments
%
elseif ( citytype == 'S' )
        loss = loss - 2.*(log10(freq/28))*2 - 5.4;
elseif( citytpe == 'O' )
        loss = loss - 4.78*(log10(freq))*2 + 18.33*log10(freq) - 40.94;
elseif ( citytype ~= 'M' )
        'City type not recognized'
end;
loss = loss - mobgain;
```

TABLE 7

© COPYRIGHT 1995 SPECTRUM WIRELESS, INC.

```
function cover19(MobilePower,MobileHeight,CollectorHeight,...
                BasePower,BaseHeight,CityType)
%
% function coverit(MobilePower,MobileHeight,CollectorHeight,
%                BasePower,BaseHeight,CityType)
%     This function will take the list of collector locations below
%     and determine the coverage for a zone determined by the coverage
%     of the specified base station, using the specified mobile power
%     and collector heights. The parameters set below include the noise
%     floor, acceptable signal-to-noise ratios, and the number of
%     trials. A number of trials at randomly distributed points over the
%     coverage circle will be performed.
%
Nc = 19;
Location = [[ 0.0 3.8 ];...
            [ -1.6 2.7 ]; [ 1.6 2.7 ];...
            [ -3.2 1.9 ]; [ 0.0 1.9 ]; [ 3.2 1.8 ];...
            [ -1.6 0.9 ]; [ 1.6 0.9 ];...
            [ -3.2 0.0 ]; [ 0.0 0.0 ]; [ 3.2 0.0 ];...
            [ -1.6 -0.9]; [ 1.6 -0.9 ];...
            [ -3.2 -1.9 ]; [ 0.0 -1.9 ]; [ 3.2 -1.8 ];...
            [ -1.6 -2.7 ]; [ 1.6-2.7 ];...
            [ 0.0 -3.8 ]
        ];
Location = Location/4.619;
%
NoiseFloor = -125.;
%
Level3 = 20.;
Level2 = 14.;
Level1 = 12.;
AbsLev3 = NoiseFloor + Level3;
```

TABLE 7-continued

© COPYRIGHT 1995 SPECTRUM WIRELESS, INC.

```
AbsLev2 = NoiseFloor + Level2;
AbsLev1 = NoiseFloor + Level1;
Loss3 = MobilePower – AbsLev3;
Loss2 = MobilePower – AbsLev2;
Loss1 = MobilePower – AbsLev1;
%
Ntrial = 100000;
%
%      Get coverage radius from base station power and height
%
BaseLoss = BasePower – (NoiseFloor + Level3 );
R = 1.;
Loss = hata(R,BaseHeight,MobileHeight,850,CityType);
if ( Loss > BaseLoss )
        ]'Loss = ',num2str(Loss),' is too big']
        break;
end
for iii = 1:500
        if ( Loss < BaseLoss)
                R = R*1.01;
                Loss = hata(R,BaseHeight,MobileHeight,850,CityType);
        end
end;
BaseRadius = R
Location = Location*BaseRadius;
%
%      Set the distance break points
%
R = 1.;
Loss = hata(R,CollectorHeight,MobileHeight,850,CityType);
if ( Loss > Loss3)
        ['Loss = ',num2str(Loss),'is too big'];
        break;
end
for iii = 1:500
        if ( Loss < Loss3)
                R = R*1.01;
                Loss = hata(R,CollectorHeight,MobileHeight,850,CityType);
        end
end;
R3 = R
for iii = 1:500
        if ( Loss < Loss2)
                R = R*1.01;
                Loss = hata(R,CollectorHeight,MobileHeight,850,CityType);
        end
end;
R2 = R
for iii = 1:500
        if ( Loss < Loss1)
                R = R*1.01;
                Loss = hata(R,CollectorHeight,MobileHeight,850,CityType);
        end
end;
R1 = R
%
%      Get the random points
r      = BaseRadius.*rand(1,Ntriai).A(o.5);
theta = 2.pi*rand(1,Ntrial);
x      = r.*cos(theta);
y      = r.*sin(theta);
%
%      Get distances
%
Distance = zeros(Nc,Ntrial);
for ii = 1:Nc
        Distance(ii,:) =  ((x-Location(ii,1)).*2 + ...
                          (y-Location(ii,2)).*2 ).*(0.5);
end;
%
%      Get number of collectors covered
Flag = zeros(Nc,Ntrial);
Count1 = find(Distance<=R1);
Flag(Count1) = ones(1,length(Count1));
Count2 = find(Distance<=R2);
Flag(Count2) = 2.*ones(1,length(Count2));
Count3 = find(Distance<=R3);
```

TABLE 7-continued

© COPYRIGHT 1995 SPECTRUM WIRELESS, INC.

```
Flag(Count3) = 3.*ones(1,length(Count3));
Covered = sum(Flag);
%['For mobile radius = ',num2str(Rm)]
Coverage = zeros(1,Nc+1);
for ii = 0:Nc
    Coverage(ii+1) = length(find(Covered==ii))/Ntrial;
end;
Coverage
clf;
axis(BaseRadius*[1.0, 1.0, -1.0, 1.0]);
hold on;
Doit = find(Covered==0);
plot(x(Doit),y(Doit),'w.');
Doit = find(Covered==1);
plot(x(Doit),y(Doit),'y.');
Doit = find(Covered==2);
plot(x(Doit),y(Doit),'g.');
Doit = find(Covered>=3);
plot(x(Doit),y(Doit), 'm.');
xhex = BaseRadius*[ 0.0 -0.866 -0.866 0.0 0.866 0.866 0.0 ];
yhex = BaseRadius*[1.0 0.500 -0.500 -1.0 -0.500 0.500 1.0];
plot(xhex,yhex, 'w');
for ii = 1:Nc
    plot(Location(ii,1),Location(ii,2), 'wx');
end;
end
```

While the invention has been particularly shown and described with reference to preferred embodiments thereof it will be understood by those skilled in the an that various changes in form and details may be made therein without departing from the spirit and scope of the invention.

We claim:

1. A communication system having a plurality of forward channel communications and a plurality of corresponding reverse channel communications comprising, zone manager means including, broadcaster means having a broadcaster transmitter for broadcasting said plurality of forward channel communications using broadband broadcaster signals to form a plurality of broadcaster forward channels in a broadcaster zone, aggregator means for receiving said plurality of corresponding reverse channel communications;

a plurality of users in said broadcaster zone, each of said users including user receiver means for receiving a different forward channel from said broadcaster means and including user transmitter means for broadcasting user reverse channel communications in a different user reverse channel, said plurality of users providing a plurality of different user reverse channels collectively as a broadband composite signal, a plurality of collector means distributed over said broadcaster zone at spaced-apart locations, each of said collector means including broadband collector receiver means for receiving said broadband composite signal with reverse channel communications from ones of said plurality of users, and each of said collector means including collector forwarding means for forwarding, to said aggregator means, said user reverse channel communications from said ones of said plurality of users as collector reverse channel communications whereby said collector reverse channel communications are said corresponding reverse channel communications received by said aggregator means.

2. The communication system of claim 1 wherein ones of said user transmitter means broadcast in user zones that are substantially smaller than said broadcaster zone and wherein a plurality of said collector means are located within said user zones.

3. The communication system of claim 1 wherein said broadcaster transmitter is controllable for varying the transmission power for each of said broadcaster forward channels whereby the transmission power and broadcaster range for each broadcaster forward channel is individually controllable.

4. The communication system of claim 1 wherein said user transmitter for each user is controllable for varying the transmission power of said user reverse channels whereby the user range for each user is controllable for reaching a plurality of said collector means.

5. The communication system of claim 1 wherein each of said collector means includes measurement means for measuring parameters of said broadcaster signals.

6. The communication system of claim 1 wherein each of said collector means includes measurement means for measuring parameters of said composite signal to provide user parameters.

7. The communication system of claim 1 wherein each said collector means includes a digital signal processor for processing parameters of said signals.

8. The communication system of claim 1 wherein said collector forwarding means includes collector transmitter means for transmitting said collector reverse channel communications with transmission characteristics that isolate the collector reverse channel communications from the user reverse channel communications.

9. The communication system of claim 8 wherein said collector transmitter means includes a wide-band transmitter and a narrow-beamwidth, high-gain antenna.

10. The communication system of claim 8 wherein said collector transmitter means includes a horizontally polarized transmitter antenna for horizontally polarizing the collector reverse channel communications and wherein said user transmitter means for each of said plurality of users includes a vertically polarized user transmitter antenna for vertically polarizing the user reverse channel communications to isolate the user reverse channel communications from the collector reverse channel communications.

11. The communication system of claim 8 wherein said collector transmitter means includes a wide-band transmitter and a horizontally-polarized, narrow-beamwidth, high-gain transmitter antenna for horizontally polarizing the collector reverse channel communications and wherein said user transmitter means for each of said plurality of users includes a vertically polarized user transmitter antenna for vertically polarizing the user reverse channel communications to isolate the user reverse channel communications from the collector reverse channel communications.

12. The communication system of claim 8 wherein said user reverse channel communications are within a user operating spectrum having isolation bands between user reverse channel communications and said collector transmitter means includes a transmitter for transmitting said collector reverse channel communications with collector signals in said isolation bands.

13. The communication system of claim 8 wherein said user reverse channel communications are within a user operating spectrum and said collector transmitter means includes a transmitter for transmitting said collector reverse channel communications with collector signals shifted to a collector operating spectrum distinct from said user operating spectrum.

14. The communication system of claim 13 wherein said collector transmitter means includes an analog shifter for shifting the user operating spectrum to said collector operating spectrum and an analog collector transmitter for transmitting collector signals in the collector operating spectrum.

15. The communication system of claim 13 wherein said collector transmitter means includes a digital shifter for shifting the user operating spectrum to said collector operating spectrum and a digital collector transmitter for transmitting collector signals in the collector operating spectrum.

16. The communication system of claim 8 wherein said collector transmitter means is a spread-spectrum transmitter transmitting over a transmitter spectrum and said user transmitter means for each of said plurality of users has a user spectrum that is a portion of said transmitter spectrum.

17. The communication system of claim 8 wherein said collector transmitter means is a time-division multiple access transmitter and said user transmitter means for each of said plurality of users is a time-division multiple access transmitter.

18. The communication system of claim 1 wherein said forward channel communications and said reverse channel communications employ multiple access means.

19. The communication system of claim 18 wherein said multiple access means is code division multiple access means.

20. The communication system of claim 18 wherein said multiple access means is space-division multiple access means.

21. The communication system of claim 18 wherein said multiple access means is frequency-division multiple access means.

22. The communication system of claim 18 wherein said multiple access means is time-division multiple access means.

23. The communication system of claim 1 wherein particular user reverse channel communications broadcast from a particular user transmitter means are received by particular ones of said collector means and wherein said particular ones of said collector means each forwards particular collector reverse channel communications corresponding to said user reverse channel communications to said aggregator means and wherein said aggregator means includes aggregator processing means for processing said particular collector reverse channel communications from said particular ones of said collector means to form said aggregator reverse channel communications as a representation of said user reverse channel communications.

24. The communication system of claim 23 wherein said aggregator processing means includes aggregator digital signal processor means for providing said aggregator reverse channel communications wherein the uncoded bit error rate for said aggregator reverse channel communications is enhanced over the uncoded bit error rate for said user reverse channel communications received at said particular ones of said collector means.

25. The communication system of claim 23 wherein said aggregator processing means includes aggregator digital signal processor means for processing said particular collector reverse channel communications from said particular ones of said collector means to form said aggregator reverse channel communications as a representation of said user reverse channel communications.

26. The communication system of claim 25 wherein said aggregator digital signal processor means includes,
   a digital signal processor,
   synchronizing code executable by said digital signal processor for synchronizing said particular collector reverse channel communications from said particular ones of said collector means,
   locating means for processing reverse channel communications for a particular user from a plurality of collector means for determining the location of said particular user.

27. The communication system of claim 23 wherein said aggregator processing means includes selection means for selecting one of said particular collector reverse channel communications from said particular ones of said collector means to form said aggregator reverse channel communications as a representation of said user reverse channel communications.

28. The communication system of claim 27 wherein said selection means includes,
   a digital signal processor,
   synchronizing code executable by said digital signal processor for synchronizing said particular collector reverse channel communications from said particular ones of said collector means;
   measurement code executable by said digital signal processor for measuring said particular collector reverse channel communications from said particular ones of said collector means to provide measured characteristics,
   selecting code executable by said digital signal processor for selecting one of said particular collector reverse channel communications from said particular ones of said collector means based upon said measured characteristics.

29. The communication system of claim 23 wherein said aggregator processing means includes combining means for combining said particular collector reverse channel communications from said particular ones of said collector means to form said aggregator reverse channel communications as a representation of said user reverse channel communications.

30. The communication system of claim 29 wherein said combining means includes, a digital signal processor, synchronizing code executable by said digital signal processor for synchronizing said particular collector reverse channel communications from said particular ones of said collector means;

measurement code executable by said digital signal processor for measuring said particular collector reverse channel communications from said particular ones of said collector means to provide measured characteristics, combining code executable by said digital signal processor for combining said particular collector reverse channel communications from said particular ones of said collector means for providing combined signals.

31. The communication system of claim 1 wherein a particular one of said users is mobile and travels from a first location in said broadcaster zone to a second location in said broadcaster zone, said transmitter means for said particular one of said users broadcasting particular user reverse channel communications and wherein, at said first location, said particular user reverse channel communications are received by a first group of particular ones of said collector means and wherein each collector means of said first group of particular ones of said collector means forwards to said aggregator means first particular collector reverse channel communications corresponding to said particular user reverse channel communications;

at said second location, said particular user reverse channel communications are received by a second group of particular ones of said collector means and wherein each collector means of said second group of particular ones of said collector means forwards to said aggregator means second particular collector reverse channel communications corresponding to said particular user reverse channel communications;

said aggregator means receives said first and second particular collector reverse channel communications and includes aggregator processing means for processing said fast and second particular collector reverse channel communications to form said aggregator reverse channel communications as a representation of said user reverse channel communications.

32. The communication system of claim 31 wherein said one or more of said collector means is common to said fast group and said second group.

33. The communication system of claim 31 wherein said user transmitter means for said particular one of said users broadcasts in a user zone that is substantially smaller than said broadcaster zone and that moves when said particular user moves from said first location to said second location and wherein, at said first location, said first group of particular ones of said collector means are located within said user zone and wherein, at said second location, said second group of particular ones of said collector means are located within said user zone.

34. The communication system of claim 31 wherein said broadcaster transmitter is controllable for varying the transmission power for each of said broadcaster forward channels whereby the transmission power and broadcaster range for each broadcaster forward channel is individually controllable, wherein when said particular user is at said first location a particular broadcaster forward channel has a first power level so that said broadcaster range extends to said first location and wherein when said particular user is at said second location said particular broadcaster forward channel has a second power level so that said broadcaster range extends to said second location.

35. The communication system of claim 31 wherein said user transmitter for said particular user is controllable for varying transmission power of a particular user reverse channel for said particular user whereby the user range for said particular user is controllable and wherein, when said particular user is at said first location, said particular user reverse channel has a first power level so that said user range extends to said first group of particular ones of said collector means and wherein, when said particular user is at said second location, said particular user reverse channel has a second power level so that said user range extends to said second group of particular ones of said collector means.

36. The communication system of claim 31 wherein said collector transmitter means is a transmitter for transmitting said collector reverse channel communications with transmission characteristics that isolate the collector reverse channel communications from the user reverse channel communications.

37. A communication system for communicating between a network and a region with a plurality of network forward channel communications from the network and with a plurality of corresponding network reverse channel communications to the network, said system including, zone manager means including, broadcaster means for broadcasting said plurality of forward channel communications in a broadcaster zone, said broadcaster means including a broadcaster transmitter for transmitting in a plurality of broadcaster forward channels using broadband broadcaster signals, aggregator means for receiving reverse channel communications and forwarding the received reverse channel communications as aggregator reverse channel communications to the network as said network reverse channel communications, a plurality of users, each of said users including user receiver means for receiving a forward channel from said broadcaster signals and including user transmitter means for broadcasting user reverse channel communications in a user reverse channel whereby reverse channel communications from said plurality of users are in a plurality of user reverse channels collectively forming a broadband composite signal, a plurality of collector means distributed over said broadcaster zone at spaced-apart locations, each collector means including broadband collector receiver means for receiving said broadband composite signal including reverse channel communications from ones of said users, and each collector means including collector forwarding means for forwarding user reverse channel communications as collector reverse channel communications to said aggregator means.

38. A communication system for communicating between a network and one or more regions with a plurality of network forward channel communications from the network and with a plurality of corresponding network reverse channel communications to the network, said system including, one or more region manager means, one for each of said regions for controlling communications within a corresponding region, for each particular region, a plurality of zone manager means for managing communications in a plurality of broadcaster zones, respectively, each zone manager means including for a corresponding broadcaster zone, broadcaster means receiving said network forward channel communications from the region manager for the particular region and having a broadcaster transmitter for broadcasting corresponding forward channel communications using broadband broadcaster signals to form a plurality of broadcaster forward channels in said corresponding broadcaster zone, aggregator means for receiving corresponding reverse channel communications for said corresponding broadcaster zone and forwarding the received corresponding reverse channel communications as aggregator reverse channel communications to the region manager for the particular region to form said network reverse channel communications, for each broadcaster zone, a plurality of users, each of said users including user receiver means for receiving a different forward channel from said broadcaster means and including user transmitter means for broadcasting user reverse channel communications in a different user reverse channel, said plurality of users providing a plurality of different user reverse channels collectively as a broadband composite signal, a plurality of collector arrays, one for each of said broadcaster zones, each of said collector arrays including for said corresponding broadcaster zone, a plurality of collector means distributed over said corresponding broadcaster zone at spaced-apart locations, each of said collector means including broadband collector receiver means for receiving said broadband composite signal with reverse channel communications from ones of said plurality of users, and each of said collector means including collector forwarding means for forwarding, to said aggregator means, said user reverse channel communications from said ones of said plurality of users as collector reverse channel communications whereby said collector reverse channel communications are said corresponding reverse channel communications received by said aggregator means.

39. The communication system of claim 38 wherein, for a particular broadcaster zone, ones of said user transmitter means broadcast in user zones that are substantially smaller than said broadcaster zone and wherein a plurality of said collector means are located within said user zones.

40. The communication system of claim 38 wherein said broadcaster transmitter is controllable for varying the transmission power for each of said broadcaster forward channels whereby the transmission power and broadcaster range for each broadcaster forward channel is individually controllable.

41. The communication system of claim 38 wherein said user transmitter for each user is controllable for varying the transmission power of said user reverse channels whereby the user range for each user is controllable for reaching a plurality of said collector means.

42. The communication system of claim 38 wherein each of said collector means includes measurement means for measuring parameters of said broadcaster signals.

43. The communication system of claim 38 wherein each of said collector means includes measurement means for measuring parameters of said composite signal to provide user parameters.

44. The communication system of claim 38 wherein each said collector means includes a digital signal processor for processing parameters of said signals.

45. The communication system of claim 38 wherein said collector forwarding means includes collector transmitter means for transmitting said collector reverse channel communications with transmission characteristics that isolate the collector reverse channel communications from the user reverse channel communications.

46. The communication system of claim 45 wherein said collector transmitter means includes a wide-band transmitter and a narrow-beamwidth, high-gain antenna.

47. The communication system of claim 45 wherein said collector transmitter means includes a horizontally polarized transmitter antenna for horizontally polarizing the collector reverse channel communications and wherein said user transmitter means for each of said plurality of users includes a vertically polarized user transmitter antenna for vertically polarizing the user reverse channel communications to isolate the user reverse channel communications from the collector reverse channel communications.

48. The communication system of claim 45 wherein said collector transmitter means includes a wide-band transmitter and a horizontally-polarized, narrow-beamwidth, high-gain transmitter antenna for horizontally polarizing the collector reverse channel communications and wherein said user transmitter means for each of said plurality of users includes a vertically polarized user transmitter antenna for vertically polarizing the user reverse channel communications to isolate the user reverse channel communications from the collector reverse channel communications.

49. The communication system of claim 45 wherein said user reverse channel communications are within a user operating spectrum having isolation bands between user reverse channel communications and said collector transmitter means includes a transmitter for transmitting said collector reverse channel communications with collector signals in said isolation bands.

50. The communication system of claim 45 wherein said user reverse channel communications are within a user operating spectrum and said collector transmitter means includes a transmitter for transmitting said collector reverse channel communications with collector signals shifted to a collector operating spectrum distinct from said user operating spectrum.

51. The communication system of claim 50 wherein said collector transmitter means includes an analog shifter for shifting the user operating spectrum to said collector operating spectrum and an analog collector transmitter for transmitting collector signals in the collector operating spectrum.

52. The communication system of claim 50 wherein said collector transmitter means includes a digital shifter for shifting the user operating spectrum to said collector operating spectrum and a digital collector transmitter for transmitting collector signals in the collector operating spectrum.

53. The communication system of claim 45 wherein said collector transmitter means is a spread-spectrum transmitter transmitting over a transmitter spectrum and said user transmitter means for each of said plurality of users has a user spectrum that is a portion of said transmitter spectrum.

54. The communication system of claim 45 wherein said collector transmitter means is a time-division multiple access transmitter and said user transmitter means for each of said plurality of users is a time-division multiple access transmitter.

55. The communication system of claim 38 wherein said forward channel communications and said reverse channel communications employ multiple access means.

56. The communication system of claim 55 wherein said multiple access means is code division multiple access means.

57. The communication system of claim 55 wherein said multiple access means is space-division multiple access means.

58. The communication system of claim 55 wherein said multiple access means is frequency-division multiple access means.

59. The communication system of claim 55 wherein said multiple access means is time-division multiple access means.

60. The communication system of claim 38 wherein particular user reverse channel communications broadcast from a particular user transmitter means are received by particular ones of said collector means and wherein said particular ones of said collector means each forwards particular collector reverse channel communications corresponding to said user reverse channel communications to said aggregator means and wherein said aggregator means includes aggregator processing means for processing said particular collector reverse channel communications from said particular ones of said collector means to form said aggregator reverse channel communications as a representation of said user reverse channel communications.

61. The communication system of claim 60 wherein said aggregator processing means includes aggregator digital signal processor means for processing said particular collector reverse channel communications from said particular ones of said collector means to form said aggregator reverse channel communications as a representation of said user reverse channel communications.

62. The communication system of claim 61 wherein said aggregator digital signal processor means includes,
a digital signal processor,
synchronizing code executable by said digital signal processor for synchronizing said particular collector reverse channel communications from said particular ones of said collector means,
locating means for processing reverse channel communications for a particular user from a plurality of collector means for determining the location of said particular user.

63. The communication system of claim 60 wherein said aggregator processing means includes selection means for selecting one of said particular collector reverse channel communications from said particular ones of said collector means to form said aggregator reverse channel communications as a representation of said user reverse channel communications.

64. The communication system of claim 63 wherein said selection means includes,
a digital signal processor,
synchronizing code executable by said digital signal processor for synchronizing said particular collector reverse channel communications from said particular ones of said collector means;
measurement code executable by said digital signal processor for measuring said particular collector reverse channel communications from said particular ones of said collector means to provide measured characteristics,
selecting code executable by said digital signal processor for selecting one of said particular collector reverse channel communications from said particular ones of said collector means based upon said measured characteristics.

65. The communication system of claim 60 wherein said aggregator processing means includes combining means for combining said particular collector reverse channel communications from said particular ones of said collector means to form said aggregator reverse channel communications as a representation of said user reverse channel communications.

66. The communication system of claim 65 wherein said combining means includes,
a digital signal processor,
synchronizing code executable by said digital signal processor for synchronizing said particular collector reverse channel communications from said particular ones of said collector means;
measurement code executable by said digital signal processor for measuring said particular collector reverse channel communications from said particular ones of said collector means to provide measured characteristics,
combining code executable by said digital signal processor for combining said particular collector reverse channel communications from said particular ones of said collector means for providing combined signals.

67. The communication system of claim 38 wherein a particular one of said users is mobile and travels from a first location in said broadcaster zone to a second location in said broadcaster zone, said transmitter means for said particular one of said users broadcasting particular user reverse channel communications and wherein,
at said first location, said particular user reverse channel communications are received by a fast group of particular ones of said collector means and wherein each collector means of said first group of particular ones of said collector means forwards to said aggregator means first particular collector reverse channel communications corresponding to said particular user reverse channel communications;
at said second location, said particular user reverse channel communications are received by a second group of particular ones of said collector means and wherein each collector means of said second group of particular ones of said collector means forwards to said aggregator means second particular collector reverse channel communications corresponding to said particular user reverse channel communications;
said aggregator means receives said first and second particular collector reverse channel communications and includes aggregator processing means for processing said first and second particular collector reverse channel communications to form said aggregator reverse channel communications as a representation of said user reverse channel communications.

68. The communication system of claim 67 wherein said one or more of said collector means is common to said first group and said second group.

69. The communication system of claim 67 wherein said user transmitter means for said particular one of said users broadcast in a user zone that is substantially smaller than said broadcaster zone and that moves when said particular user moves from said first location to said second location and wherein, at said first location, said first group of particular ones of said collector means are located within said user zone and wherein, at said second location, said second group of particular ones of said collector means are located within said user zone.

70. The communication system of claim 67 wherein said broadcaster transmitter is controllable for varying the transmission power for each of said broadcaster forward channels whereby the transmission power and broadcaster range for each broadcaster forward channel is individually controllable, wherein when said particular user is at said first location a particular broadcaster forward channel has a first power level so that said broadcaster range extends to said first location and wherein when said particular user is at said second location said particular broadcaster forward channel has a second power level so that said broadcaster range extends to said second location.

71. The communication system of claim 67 wherein said user transmitter for said particular user is controllable for varying transmission power of a particular user reverse channel for said particular user whereby the user range for said particular user is controllable and wherein, when said particular user is at said first location, said particular user reverse channel has a first power level so that said user range extends to said first group of particular ones of said collector means and wherein, when said particular user is at said second location, said particular user reverse channel has a second power level so that said user range extends to said second group of particular ones of said collector means.

72. The communication system of claim 67 wherein said collector transmitter means is a transmitter for transmitting said collector reverse channel communications with transmission characteristics that isolate the collector reverse channel communications from the user reverse channel communications.

73. The communication system of claim 38 wherein said zone manager means includes control means for assigning a broadcaster forward channel and a user reverse channel for a particular user under control of said region manager.

74. The communication system of claim 38 wherein said region manager means includes means for assigning forward channels and reverse channels with a reuse pattern.

75. The communication system of claim 38 wherein said region manager means stores a fixed reuse pattern and said zone manager means includes control means for assigning a broadcaster forward channel and a user reverse channel for a particular user according to said fixed reuse pattern under control of said region manager.

76. The communication system of claim 38 wherein said region manager means includes dynamic control means for dynamic channel allocation and wherein said zone manager means includes control means for assigning a broadcaster forward channel and a user reverse channel for a particular user according to said dynamic channel allocation under control of said region manager.

77. The communication system of claim 76 wherein said region manager means includes a history data base and wherein said dynamic control means executes said dynamic channel allocation as a function of data from said history data base.

78. The communication system of claim 77 wherein said region manager means includes location means and means for updating said history data base with location data from said location means.

79. The communication system of claim 76 wherein said region manager means includes movement means for determining the direction and speed of a particular user and wherein said dynamic control means executes said dynamic channel allocation as a function of the direction and speed of said particular user.

80. The communication system of claim 38 wherein a particular user is one of said users and travels from a first one of said broadcaster zones to a second one of said broadcaster zones and wherein said region manager includes control means for assigning a first broadcaster forward channel and a first user reverse channel for said particular one of said users for said first zone and for assigning a second broadcaster forward channel and a second user reverse channel for said particular one of said users for said second zone.

81. The communication system of claim 38 wherein a particular one of said users is mobile and travels from a first one of said broadcaster zones to a second one of said broadcaster zones and wherein,
  said plurality of collector arrays include,
    a first collector array corresponding to said lust broadcaster zone having a plurality of first collector means for providing a plurality of first user signals from said user reverse channel communications of said particular user, and
    a second collector array corresponding to said second broadcaster zone having a plurality of second collector means for providing a plurality of second user signals from said user reverse channel communications of said particular user,
  said plurality of zone manager means includes,
    a first one of said zone manager means for said first broadcaster zone including a first one of said aggregator means for receiving and processing said plurality of first user signals to form a first aggregated signal,
    a second one of said zone manager means for said second broadcaster zone including a second one of said aggregator means for receiving and processing said plurality of second user signals to form a second aggregated signal,
  said one or more region manager means includes,
    a first one of said region manager means for a region including said first broadcaster zone and said second broadcaster zone, said region manager means including,
      control means for assigning a first forward channel and a first reverse channel for said particular user in said first broadcaster zone and for assigning a second forward channel and a second reverse channel for said particular user in said second broadcaster zone,
      means for receiving said first and second aggregated signals,
      means for controlling the handoff said particular user from said fast forward channel and said fast reverse channel to said second forward channel and said second reverse channel as a function of said fast and second aggregated signals.

82. The communication system of claim 81 wherein said means for controlling the handoff includes means for sensing the strength of said fast and second aggregated signals and for permitting said handoff to occur when the strength of said second aggregated signal is greater than the strength of said fast aggregated signal.

83. The communication system of claim 81 wherein said region manager means includes location means for determining the location of said particular user and said means for controlling the handoff includes means for sensing the strength of said first and second aggregated signals and for determining when said handoff occurs as a function of the strength of said fast and second aggregated signals and the location of said particular user.

84. The communication system of claim 81 wherein said region manager means includes a history data base for storing location data representing signal strengths as a function of location and said means for controlling the handoff determines when said handoff occurs as a function of the location of said particular user and data from said history data base.

85. The communication system of claim 84 wherein said region manager means includes means for updating said history data base with location data from said location means.

86. The communication system of claim 81 wherein said region manager means includes movement means for determining the direction and speed of said particular user and for determining when said handoff occurs as a function of the direction and speed of said particular user.

87. The communication system of claim 38 wherein a particular one of said users is mobile and travels from a first one of said broadcaster zones to a second one of said broadcaster zones among one or more additional broadcaster zones of said broadcaster zones and wherein, said plurality of collector arrays include,
a first collector array corresponding to said first broadcaster zone having a plurality of first collector means for providing a plurality of first user signals from said user reverse channel communications of said particular user, and
one or more additional collector arrays corresponding to said one or more additional broadcaster zones each having a plurality of one or more additional collector means for providing a plurality of one or more additional user signals from said user reverse channel communications of said particular user,
said one or more additional collector arrays including a second collector array corresponding to said second broadcaster zone having a plurality of second collector means for providing a plurality of second user signals from said user reverse channel communications of said particular user, said plurality of zone manager means includes,
a first one of said zone manager means for said first broadcaster zone including a first one of said aggregator means for receiving and processing said plurality of first user signals to form a first aggregated signal,
one or more additional ones of said zone manager means for said one or more additional broadcaster zones including one or more additional ones of said aggregator means for receiving and processing said plurality of one or more additional user signals to form one or more additional aggregated signals,
said one or more additional ones of said zone manager means including a second one of said zone manager means for said second broadcaster zone including a second one of said aggregator means for receiving and processing said plurality of second user signals to form a second aggregated signal, said one or more region manager means includes,
a first one of said region manager means for a region including said first broadcaster zone and one or more additional broadcaster zones including said second broadcaster zone, said region manager means including,
control means for assigning a first forward channel and a first reverse channel for said particular user in said first broadcaster zone and for assigning a second forward channel and a second reverse channel for said particular user in said second broadcaster zone,
means for receiving said first and said one or more additional aggregated signals including said second aggregated signal,
means for controlling the handoff said particular user from said first forward channel and said first reverse channel to said second forward channel and said second reverse channel as a function of said first and said one or more additional aggregated signals including said second aggregated signal.

88. The communication system of claim 87 wherein said means for controlling the handoff includes means for sensing the strength of said first and said one or more additional aggregated signals and for selecting said second aggregated signal from among said one or more additional aggregated signals and for permitting said handoff to occur when the strength of said second aggregated signal is greater than the strength of said first aggregated signal.

89. The communication system of claim 87 wherein said region manager means includes location means for determining the location of said particular user and said means for controlling the handoff includes means for sensing the strength of said first and said one or more additional aggregated signals and for selecting said second aggregated signal from among said one or more additional aggregated signals and for determining when said handoff occurs as a function of the strength of said first and second aggregated signals and the location of said particular user.

90. The communication system of claim 87 wherein said region manager means includes location means for determining the location of said particular user and said means for controlling the handoff includes means for signaling particular ones of said zone manager means to be active to sense reverse channel communications from said particular user based upon the proximity of said user to said particular zone managers.

91. The communication system of claim 90 wherein said region manager means includes a history data base for storing location data representing signal strengths as a function of location and said means for controlling the handoff determines when said handoff occurs as a function of the location of said particular user and data from said history data base.

92. The communication system of claim 87 wherein said region manager means includes means for updating said history data base with location data from said location means.

93. The communication system of claim 81 wherein said region manager means includes movement means for determining the direction and speed of said particular user and for determining when said hand off occurs as a function of the direction and speed of said particular user.

94. The communication system of claim 38 wherein a particular one of said users is mobile and travels from a first location in one of said broadcaster zones to a second location in said one of said broadcaster zones, said transmitter means for said particular one of said users broadcasting particular user reverse channel communications and wherein, at said fast location, said particular user reverse channel communications are received by a fast group of particular ones of said collector means and wherein each collector means of said fast group of particular ones of said collector means forwards to said aggregator means fast particular collector reverse channel communications corresponding to said particular user reverse channel communications;
at said second location, said particular user reverse channel communications are received by a second group of particular ones of said collector means and wherein each collector means of said second group of particular ones of said collector means forwards to said aggregator means second particular collector reverse channel communications corresponding to said particular user reverse channel communications;

said aggregator means receives said lust and second particular collector reverse channel communications and includes aggregator processing means for processing said fast and second particular collector reverse channel communications to form said aggregator reverse channel communications as a representation of said user reverse channel communications.

95. The communication system of claim 94 wherein said one or more of said collector means is common to said first group and said second group.

96. The communication system of claim 94 wherein said user transmitter means for said particular one of said users broadcast in a user zone that is substantially smaller than said one of said broadcaster zones and that moves when said particular user moves from said first location to said second location and wherein, at said first location, said first group of particular ones of said collector means are located within said user zone and wherein, at said second location, said second group of particular ones of said collector means are located within said user zone.

97. The communication system of claim 94 wherein said broadcaster transmitter is controllable for varying the transmission power for each of said broadcaster forward channels whereby the transmission power and broadcaster range for each broadcaster forward channel is individually controllable, wherein when said particular user is at said first location a particular broadcaster forward channel has a first power level so that said broadcaster range extends to said fast location and wherein when said particular user is at said second location said particular broadcaster forward channel has a second power level so that said broadcaster range extends to said second location.

98. The communication system of claim 94 wherein said user transmitter for said particular user is controllable for varying transmission power of a particular user reverse channel for said particular user whereby the user range for said particular user is controllable and wherein, when said particular user is at said fast location, said particular user reverse channel has a first power level so that said user range extends to said first group of particular ones of said collector means and wherein, when said particular user is at said second location, said particular user reverse channel has a second power level so that said user range extends to said second group of particular ones of said collector means.

99. The communication system of claim 94 wherein said collector forwarding means is a transmitter for transmitting said collector reverse channel communications with transmission characteristics that isolate the collector reverse channel communications from the user reverse channel communications.

100. A communication system for communicating between a network and a region with a plurality of network forward channel communications from the network and with a plurality of corresponding network reverse channel communications to the network, said system including, region manager means for controlling communications within said region, a plurality of zone manager means for managing communications in a plurality of broadcaster zones, respectively, each zone manager means including for a corresponding broadcaster zone, broadcaster means receiving said network forward channel communications from the region manager and having a broadcaster transmitter for broadcasting corresponding forward channel communications using broadband broadcaster signals to form a plurality of broadcaster forward channels in said corresponding broadcaster zone, aggregator means for receiving corresponding reverse channel communications for said corresponding broadcaster zone and forwarding the received corresponding reverse channel communications as aggregator reverse channel communications to the region manager to form said network reverse channel communications, for each broadcaster zone, a plurality of users, wherein particular ones of said users are mobile and travel from one of said broadcaster zones to another one of said broadcaster zones, each of said users includes user receiver means for receiving a different forward channel from said broadcaster means and including user transmitter means for broadcasting user reverse channel communications in a different user reverse channel, said plurality of users providing a plurality of different user reverse channels collectively as a broadband composite signal, a plurality of collector arrays, one for each of said broadcaster zones, each of said collector arrays including for said corresponding broadcaster zone, a plurality of collector means distributed over said corresponding broadcaster zone at spaced-apart locations, each of said collector means including broadband collector receiver means for receiving said broadband composite signal with reverse channel communications from ones of said plurality of users, and each of said collector means including collector forwarding means for forwarding, to said aggregator means, said user reverse channel communications from said ones of said plurality of users as collector reverse channel communications where said collector reverse channel communications are said corresponding reverse channel communications received by said aggregator means.

101. The communication system of claim 100 wherein said collector means are located with non-uniform spacing.

102. The communication system of claim 100 wherein said collector means are located with different heights.

103. The communication system of claim 100 wherein said users in a particular one of said broadcaster zones are located more densely in a first area and less densely in a second area and wherein a greater number of said collector means are located within said first area than in said second area.

104. The communication system of claim 100 wherein said region manager means includes means for dynamically assigning forward channels and reverse channels.

105. The communication system of claim 100 wherein said region manager means includes means for assigning forward channels and reverse channels with a reuse pattern.

106. A communication system having a plurality of forward channel communications and a plurality of corresponding reverse channel communications comprising, for zone manager means, broadcasting, with a broadcaster means having a broadcaster transmitter, said plurality of forward channel communications using broadband broadcaster signals to form a plurality of broadcaster forward channels in a broadcaster zone, receiving, with aggregator means, said plurality of corresponding reverse channel communications;

for a plurality of users in said broadcaster zone,
    for each of said users,
        receiving, with user receiver means, a different forward channel from said broadcaster means, and
        broadcasting, with user transmitter means, user reverse channel communications in a different user reverse channel,
        said broadcasting for a plurality of users providing a plurality of different user reverse channels collectively as a broadband composite signal, for each of a plurality of collector means distributed over said broadcaster zone at spaced-apart locations,
    receiving, with broadband collector receiver means, said broadband composite signal with reverse channel communications from ones of said plurality of users, and
    forwarding to said aggregator means, with collector forwarding means, said user reverse channel communications from said ones of said plurality of users as collector reverse channel communications whereby said collector reverse channel communications are said corresponding reverse channel communications received by said aggregator means.

107. The communication system of claim 106 wherein ones of said user transmitter means broadcast in user zones that are substantially smaller than said broadcaster zone and wherein a plurality of said collector means are located within said user zones.

108. The communication system of claim 106 further including varying the transmission power for each of said broadcaster forward channels whereby the transmission power and broadcaster range for each broadcaster forward channel is individually controllable.

109. The communication system of claim 106 further including varying the transmission power of said user reverse channels whereby the user range for each user is controllable for reaching a plurality of said collector means.

110. The communication system of claim 106 further includes measuring, in each of said collector means, parameters of said broadcaster signals.

111. The communication system of claim 106 further includes measuring, in each of said collector means, parameters of said composite signal to provide user parameters.

* * * * *